United States Patent
Dushine et al.

(10) Patent No.: US 10,350,561 B1
(45) Date of Patent: *Jul. 16, 2019

(54) MAGNETIC STIRRING SYSTEM FOR WINE AERATION AND METHOD OF USING SAME

(71) Applicants: Boris Dushine, Highland Beach, FL (US); Annya Dushine, Boca Raton, FL (US)

(72) Inventors: Boris Dushine, Highland Beach, FL (US); Annya Dushine, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,648

(22) Filed: Jan. 10, 2019

Related U.S. Application Data

(63) Continuation-in-part of application No. 16/054,256, filed on Aug. 3, 2018, now Pat. No. 10,220,361.

(51) Int. Cl.
*B01F 13/08* (2006.01)
*B01F 15/00* (2006.01)

(52) U.S. Cl.
CPC ...... *B01F 13/0818* (2013.01); *B01F 13/0845* (2013.01); *B01F 15/00538* (2013.01); *B01F 2015/00597* (2013.01); *B01F 2215/0072* (2013.01)

(58) Field of Classification Search
CPC .................................................. B01F 13/0818
USPC .............................. 366/273, 274; 261/83, 84
See application file for complete search history.

(56) References Cited

U.S. PATENT DOCUMENTS

| | | | |
|---|---|---|---|
| 2,546,949 A | 3/1951 | Morrison, Jr. | |
| 2,549,121 A | 4/1951 | Osterheld | |
| 3,172,645 A | 3/1965 | Price, Jr. | |
| 4,498,785 A | 2/1985 | De Bruyne | |
| 5,797,313 A | 8/1998 | Rothley | |
| 6,332,706 B1 | 12/2001 | Hall | |
| 7,629,167 B2 | 12/2009 | Hodge et al. | |
| 8,057,092 B2 | 11/2011 | Ryan et al. | |
| 8,282,268 B2 | 10/2012 | Karkos, Jr. et al. | |
| 8,480,292 B2 | 7/2013 | Dushine et al. | |
| 9,751,054 B2 | 9/2017 | Jin et al. | |
| 9,815,035 B2 | 11/2017 | Werth et al. | |
| 9,873,097 B1 | 1/2018 | Dushine et al. | |
| 9,873,858 B2 | 1/2018 | Boddenberg | |
| 10,220,361 B1 * | 3/2019 | Dushine | B01F 13/0854 |
| 2006/0172041 A1 | 8/2006 | Farrell | |
| 2008/0131957 A1 | 6/2008 | Ryan et al. | |
| 2010/0020634 A1 | 1/2010 | Kosmoski et al. | |
| 2011/0293807 A1 | 12/2011 | Dushine et al. | |
| 2012/0002501 A1 | 1/2012 | Ulstad et al. | |
| 2014/0263461 A1 | 9/2014 | Prokop | |
| 2014/0308416 A1 | 10/2014 | Cheng | |
| 2015/0314253 A1 | 11/2015 | Cysewski et al. | |
| 2015/0329809 A1 | 11/2015 | Cifaldi | |

(Continued)

*Primary Examiner* — David L Sorkin
(74) *Attorney, Agent, or Firm* — Chalin A. Smith; Smith Patent, LLC

(57) ABSTRACT

A system and method for automatically aerating drinking products, particularly wine, suitable home, business and/or industrial use is described herein. The system of the present invention is specifically designed for aerating wine for human consumption and includes a multipurpose stirring, storing and serving vessel having a removable magnetic stirring impeller coupled thereto and a programmable magnetic stir plate adapted for use therewith.

33 Claims, 15 Drawing Sheets

(56) References Cited

U.S. PATENT DOCUMENTS

2016/0114300 A1    4/2016   Pagliaro et al.
2016/0244710 A1    4/2016   Wood et al.
2016/0339398 A1   11/2016   Stevenson et al.

\* cited by examiner

PRIOR ART  FIGURE 4A
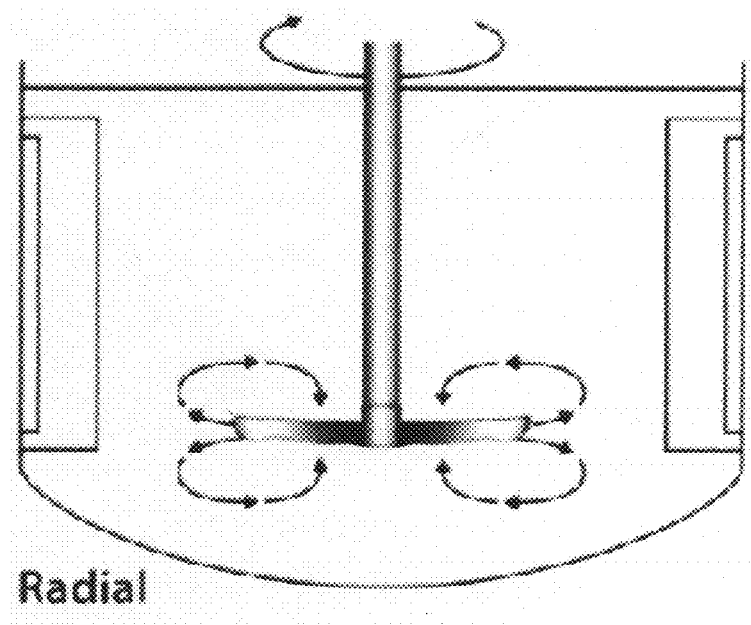
PRIOR ART  FIGURE 4B
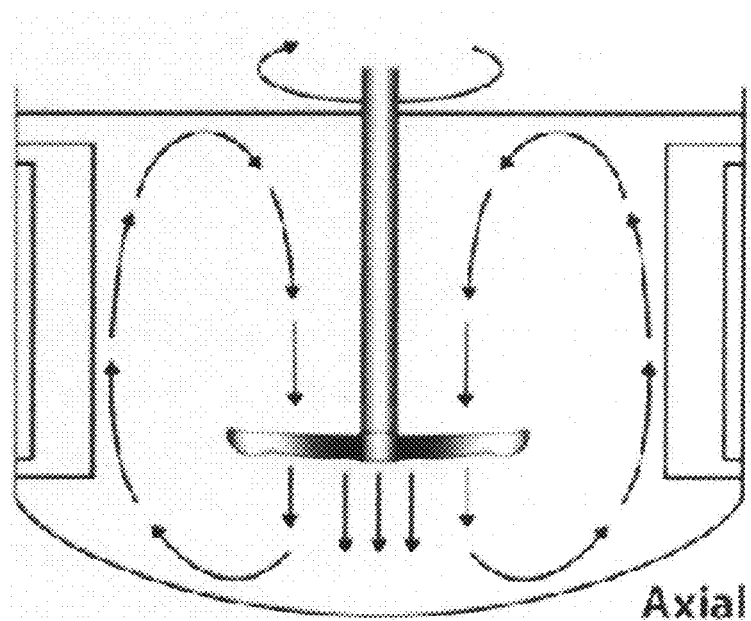

SECTION A-A

SECTION A-A

SECTION A-A

SECTION A-A

MAGNETIC STIRRING SYSTEM FOR WINE AERATION AND METHOD OF USING SAME

PRIORITY

This application is a continuation-in-part of U.S. application Ser. No. 16/054,256 filed Aug. 3, 2018, the contents of which are hereby incorporated by reference in their entirety.

FIELD OF THE INVENTION

The present invention relates broadly and generally to the field of magnetic stirrers or mixers suitable for industrial, business and home consumer use, as exemplified by U.S. Pat. No. 8,480,292 (Dushine et al.) and U.S. Pat. No. 9,873,097 (Dushine et al.), the contents of which are incorporated by reference in their entirety. More particularly, the present invention relates to an automated wine aeration system in which a magnetically induced vortex is used to expose wine to air as well as methods using same.

BACKGROUND

Wine lovers have known for centuries that decanting wine before serving it often improves its flavor. Exposing wine to air—a process referred to as letting the wine "breathe"—triggers two critical processes, namely oxidation and evaporation. Wine is made up hundreds of organic compounds and, in general, the volatile ones constitute the less desirable notes. Exposure to air allows these undesirable compounds to evaporate faster than the desirable, aromatic and flavorful ones, leaving behind a wine that is smoother and more appealing. Two particular categories of compounds that tend to reduced with aeration, include sulfites, which are generally added to wine to prevent oxidation and microbial activity, and sulfides, which are naturally occurring. Both can negatively impact the smell (or "bouquet") as well as flavor of the wine. Likewise, excess ethanol notes can be reduced with aeration.

As the wine "breathes", it will also begin to oxidize and the flavors and aromas will flatten out. The more dense and concentrated a wine is, the more it will benefit from aeration and the longer it can go before beginning to fade. A decanter has been traditionally used to accomplish aeration but can be time consuming: while older, more full-bodied red wines, and even some white wines, are improved after 25 to 30 minutes, intensely tannic or younger red wines may need 1-3 hours to achieve optimal results. Accordingly, there are many aerating devices and methods available in the marketplace offering means to accelerate the process.

Of the currently available methods, some involve actively introducing air into the wine bottle, for example with a aeration element or "bubble" such as described in U.S. Pat. No. 5,595,104 (Delaplaine). Others devices attempt to provide a greater exposure to surrounding air while the wine is being poured; see, for example, the Venturi apparatus described in U.S. Pat. No. 7,841,584 (Sabadicci et al.). Still others attempt to agitate the wine, for example by means of a stirring mechanism that is either inserted into the original bottle or a separate decanter. For example, wine stirrers that use a small rotating magnetic stir bar to "swirl" and aerate are known in the art, as exemplified by U.S. Pat. No. 6,332,706 (Hall) and U.S. Patent Publication Nos. 2015/0314253 (Cysewski et al.) and 2015/0329809 (Cifaldi). However, these "magnetic stirrers" have a number of drawbacks.

To prepare solutions, magnetic mixers and stirrers have been used by the scientific community in chemistry and biology and in academic and industrial laboratories for decades. The first U.S. Patent titled "Magnetic Stirrer", U.S. Pat. No. 2,350,534, was issued in 1944 and included a coated stir bar. In terms of the critical components, little has changed since then. Namely, an industrial or laboratory grade magnetic stirrer includes three primary elements: a flat-topped housing (referred to in the art as the "stir plate") that includes internal rotating drive magnet(s), a coordinating flat-bottomed vessel (such as a flask or beaker), and a small magnetic stir bar. In use, the magnetic stir bar is placed in the vessel containing the liquid or solution of interest. Then, the two are placed on the stir plate. Activation of the drive magnet(s) in the stir plate causes the corresponding magnetic stir bar to rotate and thereby generate a mass of whirling, swirling fluid referred to in the art as a "vortex", which, in turn, causes the fluid to be mixed or stirred.

In the context of magnetic stirring systems, the magnetic stir bar must properly "coupled" with the corresponding drive magnet. However, calculating the attractive force between two magnets is, in the general case, an extremely complex operation, as it depends on the shape, magnetization, orientation and separation of the magnets. Furthermore, the coupling or magnetic attraction of the stir bar to the drive magnet is very fragile and depends on a few variable parameters like positioning center of the magnetic schematic, RPM of the motor, viscosity of the fluid, and length of the stir bar, etc. Accordingly, centering the vessel, and more particularly the magnetic stir bar freely moving in the fluid contained therein, on the stir plate is critical to functionality. However, even when the plate has a printed target directly over the center to help find it, this is not an easy task. Moreover, as magnetic attraction force is very sensitive to the distance or separation between two magnets and exponentially reduces with distance, even small errors in alignment can result in the stir bar being decoupled, or "spun out". Thus, conventional systems recommend that the stirring speed be incrementally increased, very slowly, until the desired vortex pattern is achieved.

In the magnetic wine aerators of the prior art such as exemplified by Hall, Cysewski, and Cifaldi referenced above, the stir bar is unattached and thus allowed to move freely around the bottom of the vessel in a potentially distracting manner. However, other disadvantages also arise. For example, as wine is poured out of the container, the unsecured stir bar has a high likelihood of falling out of the vessel where, at best, it may be lost (thereby rendering useless the entire system) and, in a worse case, constitute a significant choking hazard. More critically, such systems tend to be plagued by the problem of "spin out" discussed above. In particular, the horizontal orientation of magnetization along the length of the stir bar, along with its relatively small size and the relatively low magnetic energy of its constituting material, contribute to a weak magnetic coupling force which, in turn, makes decoupling much more probable and problematic. While low speeds tend to reduce decoupling, they are incapable of generating a vortex of sufficient surface area in a large volume vessel, especially when using small stir bars such as described in the prior art. Furthermore, due to the size, shape and Teflon-coated AlNiCo construction, conventional stir bars tend to readily demagnetize, particularly when separated from the magnet assembly of the stir plate for any length of time.

Accordingly, there is a need in the art for an improved magnetically-driven wine aerating system that solves these and other problems of the prior art.

SUMMARY OF THE INVENTION

Further to the above-noted need in the art, it is accordingly an objective of the present invention to provide a magnetic stirring system that overcomes the drawbacks of existing manual and automatic wine aeration systems and methods by including an improved axial flow magnetic impeller that optimizes vortex formation while minimizing "spin out". Scientists and wine enthusiasts alike have long known that the swirling motion that mixes oxygen into a wine enhances its flavor. The shape, depth and speed of the vortex can greatly contribute to the process of aeration. The forces created inside of the vortex affecting the wine is the centrifugal force pushing the liquid to the outside of the glass and the gravitational force shoving the liquid back down. As discussed in greater detail hereinbelow, the magnetic stirring system of the present invention includes an ergonomically shaped decanter-like vessel and a removable magnetic stirring impeller designed for axial flow that may be optionally coupled to a magnetic stir plate afforded with positioning elements as well as control and actuating elements.

Scientists and wine enthusiasts alike have long known that the swirling motion that mixes oxygen into a wine enhances its flavor. The shape, depth and speed of the vortex can greatly contribute to the process of aeration. The forces created inside of the vortex affecting the wine is the centrifugal force pushing the liquid to the outside of the glass and the gravitational force shoving the liquid back down.

A further objective of the present invention is to provide a multipurpose decanter vessel adapted to function as an all-in-one stirring vessel, serving vessel and storage vessel. The removable magnetic stirring impeller is designed to coordinate with the vessel base and retained within the vessel during use, thereby creating an integrated magnetic stirring vessel. The magnetic stirring vessel represents an apparatus that can function with existing industrial magnetic stirrers or as a component of an integrated stirring system.

As discussed above, the present invention focuses on removable, symmetrically-designed, magnetic stirring impellers that may simply be dropped into a vessel, whereby the integral magnets cause the impeller to be properly seated at the base of the vessel. As discovered herein, fluid dynamics demonstrate that as the wave propagates along the glass (or plastic) wall, the liquid is displaced back and forth from bottom to top and from the center to the periphery. In addition, for a given glass shape, the mixing and oxygenation may be optimized with an appropriate choice of vessel diameter and rotation speed. It is a further objective of the present invention to provide a method for a acceleration and deceleration control system wherein a DC motor drives the integrated stirring system. This automated control system offers better stirring and oxygenation over a manual speed adjustment control, provided that operating parameters are carefully optimized. One simple and easy way to control the speed of a motor is to regulate the amount of voltage across its terminals and this can be achieved using "Pulse Width Modulation" or PWM. This PWM signal is generated by the microcontroller and in charge of the acceleration and deceleration profiles computation. The algorithm of this nature presented in this invention determines the acceleration/deceleration profile. The rate profile employed may be symmetric or asymmetric. In the context of the present invention, asymmetric rates are particularly preferred. The linear acceleration ramp or wind-up motor speed rate built into the controller dramatically reduces decoupling of the impeller when compared to a traditional manual rotational knob control. There is also the deceleration ramp. Fluid dynamists have long observed that orbital stirring generates a wave that propagates around the inner edge of the glass, churning the liquid as it travels. The formation of wine waves begins to break, turning frothy, if the waves are moving too quickly and abruptly stop. The third deceleration ramp is introduced in the control program of the present invention, which allows the froth to subside before serving.

The objectives, aspects and features of the invention discussed herein above will become more fully apparent when the following detailed description is read in conjunction with the accompanying figures and/or examples. However, it is to be understood that both the foregoing summary of the invention and the following detailed description are of preferred embodiments and not restrictive of the invention or other alternate embodiments of the invention. Various modifications and applications may occur to those who are skilled in the art, without departing from the spirit and the scope of the invention, as described by the appended claims. Likewise, other objectives, features, benefits and advantages of the present invention will be apparent from this summary and certain embodiments described below, and will be readily apparent to those skilled in the art having knowledge in the magnetic mixing arts. Such objectives, features, benefits and advantages apparent from the above in conjunction with the accompanying examples, data, figures and all reasonable inferences to be drawn there-from are specifically incorporated herein.

BRIEF DESCRIPTION OF THE FIGURES

The above-mentioned features and objects, as well as various additional aspects and applications of the present invention, will become apparent to the skilled artisan upon consideration of the detailed description of the present invention and its preferred embodiments that follows, as well as the illustrative figures that accompany this application, wherein like reference numerals denote like elements.

FIG. 4A illustrates the fluid movement that is typical of a radial flow impeller, i.e., an impeller designed to move fluid sideways during rotation. As depicted therein, displaced fluid then either moves upwards or downwards or then back to the center towards the impellers only to be pushed outwards again to repeat the cycle.

FIG. 4B illustrates the fluid movement that is typical of an axial flow impeller, i.e., an impeller designed to move fluid in an up and down, cyclic pattern. As depicted therein, rotation of axial flow impellers makes the fluid move downwards and later upwards before being pushed down again to repeat the cycle.

DETAILED DESCRIPTION OF THE PREFERRED EMBODIMENTS

Figure 1:
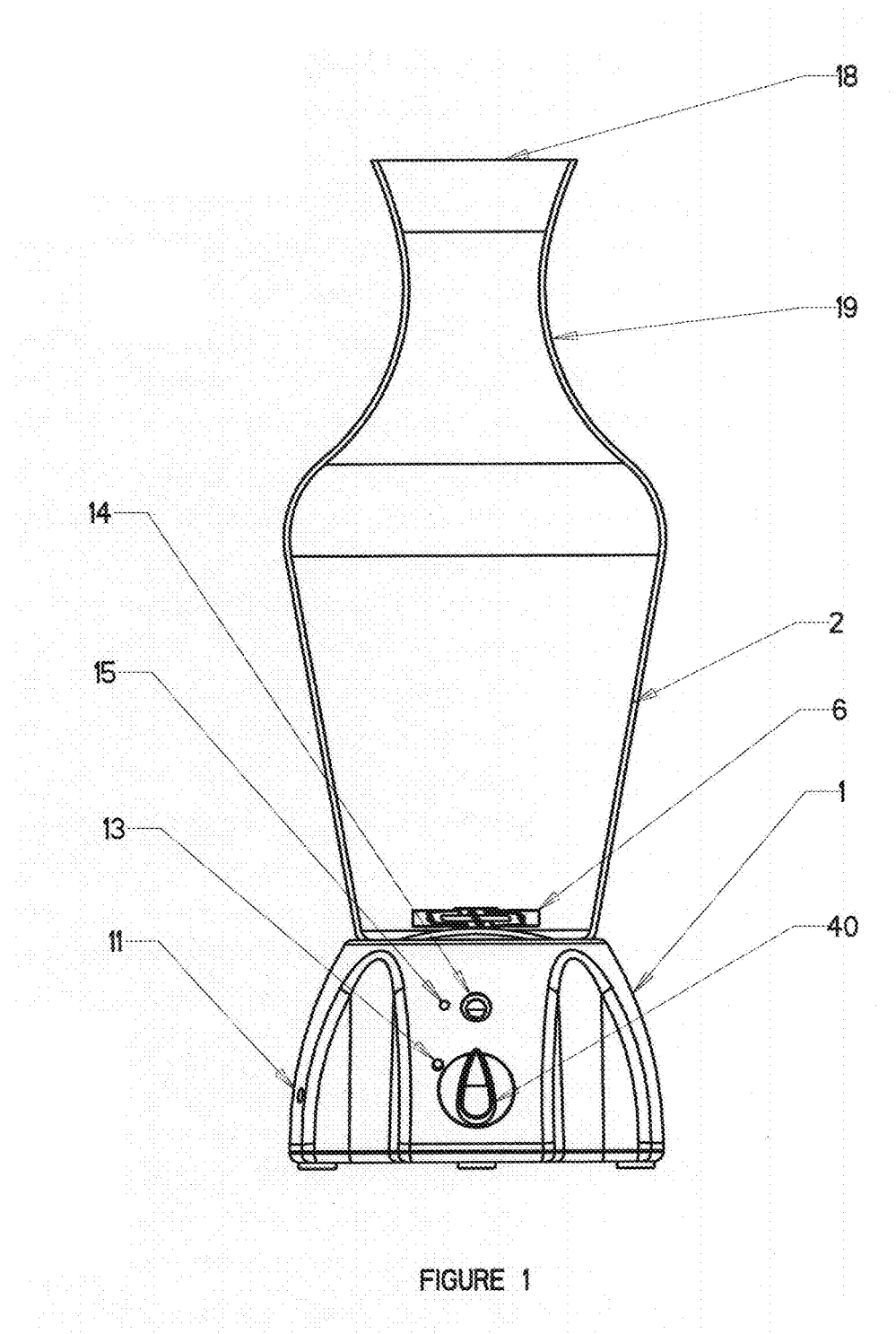
FIG. 1 is a front view of an illustrative embodiment of the magnetic stirring system (or "integrated drinking product preparation system") of the present invention in which the base of the vessel includes a convex center section that serves to centrally seat the magnetic impeller.

The present invention is more fully described hereafter with reference to the accompanying drawings, in which one or more exemplary embodiments of the present invention are shown. However, while construction and utilization of the present invention is best understood through the following text and associated figures, it is to be understood that the invention is not limited to the particular embodiments, materials, methodologies or protocols herein described, as these may vary in accordance with routine experimentation and optimization. Many such adaptations, variations, modifications, and equivalent arrangements are contemplated and thus implicitly disclosed by the embodiments described and fall within the scope of the present invention.

Herein, the terms "comprises", "comprising", "includes", "including", "has", "having", and variations thereof are intended to cover a non-exclusive inclusion. For example, a method, article, or apparatus that "comprises" a list of features is not necessarily limited only to those features and thus may include others not expressly listed and/or inherent to such method, article, or apparatus.

In a similar fashion, the words "a", "an", and "the" as used herein mean "at least one" unless otherwise specifically indicated. Where only one item is intended, the term "one", "single" or similar language is used. Likewise, when used to join a list of items, the term "or" denotes at least one of the items, but does not exclude a plurality of items of the list.

It is also to be understood that although specific terms are employed herein for the purpose of describing particular illustrative embodiments, they are used in a generic and descriptive sense only and not for the purpose of limitation and are intended to limit the scope of the present invention, which will be limited only by the appended claims.

Unless otherwise defined, all technical and scientific terms used herein have the same meaning as commonly understood by one of ordinary skill in the relevant art, such as fluid mechanics and magnetism. To the extent not described herein, many details regarding specific materials and processing acts are conventional and may be found in textbooks and other general teaching sources. It is to be understood that although specific terms are employed herein for the purpose of describing particular illustrative embodiments, they are used in a generic and descriptive sense only and not for the purpose of limitation and are intended to limit the scope of the present invention, which will be limited only by the appended claims. Accordingly, unless otherwise expressly defined, such terms are to be afforded their ordinary and customary meaning, as commonly understood by one of ordinary skill in the art and not inconsistent with that applicable to the relevant industry and without restriction to any specific embodiment hereinafter described. In case of conflict, the present specification, including following definitions, will control. Accordingly:

In the context of the present invention, the term "proximal" is used to refer to an end, portion, or direction that is situated closest to or points to the user. In contrast, the term "distal" is used to refer to that end, portion, or direction that is situated farthest away or points away from the user.

In the context of the present invention, the terms "axial" and "longitudinal" are used to refer to travel along a long axis of a component, i.e., a lengthwise direction or dimension. In contrast, the term "lateral" is used herein to refer to travel perpendicular or transverse to a long axis of the component, i.e., a side-to-side direction or dimension.

In the context of the present invention, the terms "annulus" and "annular" refer to structures having a cylindrical or ring-like shape.

In the context of the present invention, the term "radial" is used to refer to the direction that extends outward from the center of a circular or tubular structure or inward from the circumference inward along a radius.

In the context of the present invention, the term "groove" is used herein to refer to long, narrow concave furrow or channel bordered by one or more corresponding projecting (i.e., convex) "ribs", "ridges" or "flanges" that may be optionally arrayed about the periphery of the vessel, for example as finger grips.

In the context of the present invention, the magnetic stirring system for wine aeration of the present invention is at times referred to as an "integrated drinking product preparation system", both of which encompass any device that includes of a fully integrated magnetic stir plate and vessel with a removable impeller and speed control system, which is used to aerating wine for human consumption.

Within the practice of the present invention, the phrases "stir plate" and "magnetic stir plate" are alternatively used herein to refer to a magnetic stirrer that employs a rotating magnetic field to cause a magnetic stirring impeller to spin very quickly within a vessel for the purpose of aerating wine. A preferred magnetic stir plate is capable of providing mixing speeds from zero revolutions per minute (rpm) to a maximum speed of about 2400 rpm. However, in certain preferred embodiments, the profile may be designed to gradually increase from zero to a maximum of 650 rpm and again gradually back to zero over a short time period, e.g., three minutes.

Within the practice of the present invention, the term "coupling magnets" refers to two magnets within the magnetic stir plate that drive the magnetic stirring impeller via magnetic coupling.

Within the practice of the present invention, the terms "coupling" or "magnetic coupling" refers to an overlapping magnetic force between the magnetic stir plate's coupling magnets and the magnetic mixing impeller's magnets.

Within the practice of the present invention, the term "decoupling" refers to breaking the magnetic coupling force between the magnetic stir plate's coupling magnets and magnetic stirring impeller.

Within the practice of the present invention, the terms "vessel" and "stirring vessel" are used interchangeably to refer to the container into which a wine of choice is poured and subsequently aerated. The vessel is an integrated component of the magnetic stirring system for aerating wine. Vessels can be of various sizes and shapes, which give different stirring characteristics. The main purpose for the vessel is to function as a stirring vessel. The second purpose is to serve as a multi-purpose storage and serving vessel. While the size and shape of the vessel is largely a matter of design choice, for consumer use purposes, preferred embodiments should scaled to accommodate conventional (e.g., 750 ml) and/or oversized (e.g., 1.5-3.0 L) wine bottles. As a vortex can cause shift in volume, the vessel should be afforded a modicum of "headspace" beyond the liquid volume to avoid spillage.

In certain preferred embodiments, the ratio of height to diameter (either maximum diameter or average diameter) for the vessel ranges between 2:1 and 4:1, more preferably around 3:1. Typically, the height of the vessel will range from 20 to 40 cm, preferably from 20-30 cm, more preferably from 25 to 27 cm. In a preferred embodiment, the diameter of the vessel will vary along the height, gradually widening from the stable, relatively planar base (characterized by a diameter on the order of 5-10 cm, preferably around 7 to 8 cm) to a maximized hip portion (characterized by a diameter on the order of 10-15 cm, preferably around 12-13 cm) and then tapering to a narrowed neck portion (characterized by a diameter on the order of 3-6 cm, preferably around 4-5 cm) and optionally including a flared lip or spout (characterized by a diameter on the order of 5 to 9 cm, preferably around 7-8 cm). Aspect ratios are significant factors in specifying the vessel's agitation requirements. These rough vessel dimensions show excellent mixing and vortex dynamics.

For both aesthetic and functional reasons, glass is a classical choice of material to use for aerating wine. Accordingly, in the context of the present invention, the vessel is preferably clear or transparent, preferably fabricated from glass using a blow-molding process that can produce hollow parts with very complex shapes. Polycarbonate and acrylic materials are also contemplated, as is "tempered glass", also known as safety glass, a glass is strengthened through thermal or chemical treatment. As for the shape, it is critical that the top opening (or "spout") of any suitable vessel be wide enough to accept a coordinating magnetic stirring impeller. In addition, the base of the vessel should be sufficiently widened, both so as to be vertically stable and so as to allow for the proper positioning of the magnetic stirring impeller. However, the remaining features of the vessel are largely a matter of design. For example, in certain preferred embodiments, the vessel has a rounded or curved profile that allows for smooth fluid flow as well as ergonomic handling. Optional finger grooves are also contemplated.

In a preferred embodiment, the base of the vessel, or at least its periphery, is relatively planar so as to ensure upright stability. However, in certain preferred embodiments, particularly those fabricated through blow molding, the base may include a convex center section. In either case, base should be dimensioned to a diameter nest within or coordinate with the positioning component(s) of the stir plate. For example, to ensure stable and secure alignment of vessel and stir plate, the magnetic stirring system of the present invention may optionally be provided with one or more positioning components, such as integral recess grooves and/or snap-in adapters sized to coordinate and/or mate with the outer diameter of a corresponding vessel. In this manner, the magnetic stir plate may be adapted to accommodate any standard sized, commercially available carafe or decanter as well as larger storage vessels.

The remaining features are largely a matter of design. For example, the top opening should be wide enough to accept the spout of a conventional wine bottle yet narrow enough to prevent the contents from spilling or sloshing out during operation. In a preferred embodiment, the neck portion is tapered to allow for easy gripping and the base portion is widened to accommodate the volume and act as a stabilizer. Thus, the vessel may take the form of a conventional carafe, decanter or flask, comprised of a relatively flat or planar bottom, a relatively conical, ovoid, or rounded body that tapers back to a relatively long and cylindrical neck portion. The opening may optionally be provided with a slight lip adapted to mate with an optional closure mechanism, such as a rubber, glass or acrylic stopper, useful for storage purposes.

In prior applications, the present inventions have focused on snap-fit or captive impellers; see, e.g., U.S. Pat. No. 8,480,292 referenced above and incorporated by reference herein. However, we have discovered a removable impeller design that offers a few important advantages, namely:

The impeller can be removed from the vessel, which makes it easier to clean.

The vessel design is much simpler, and thus cheaper to manufacture, and moreover more ergonomically correct for a consumer.

Figure 3A:
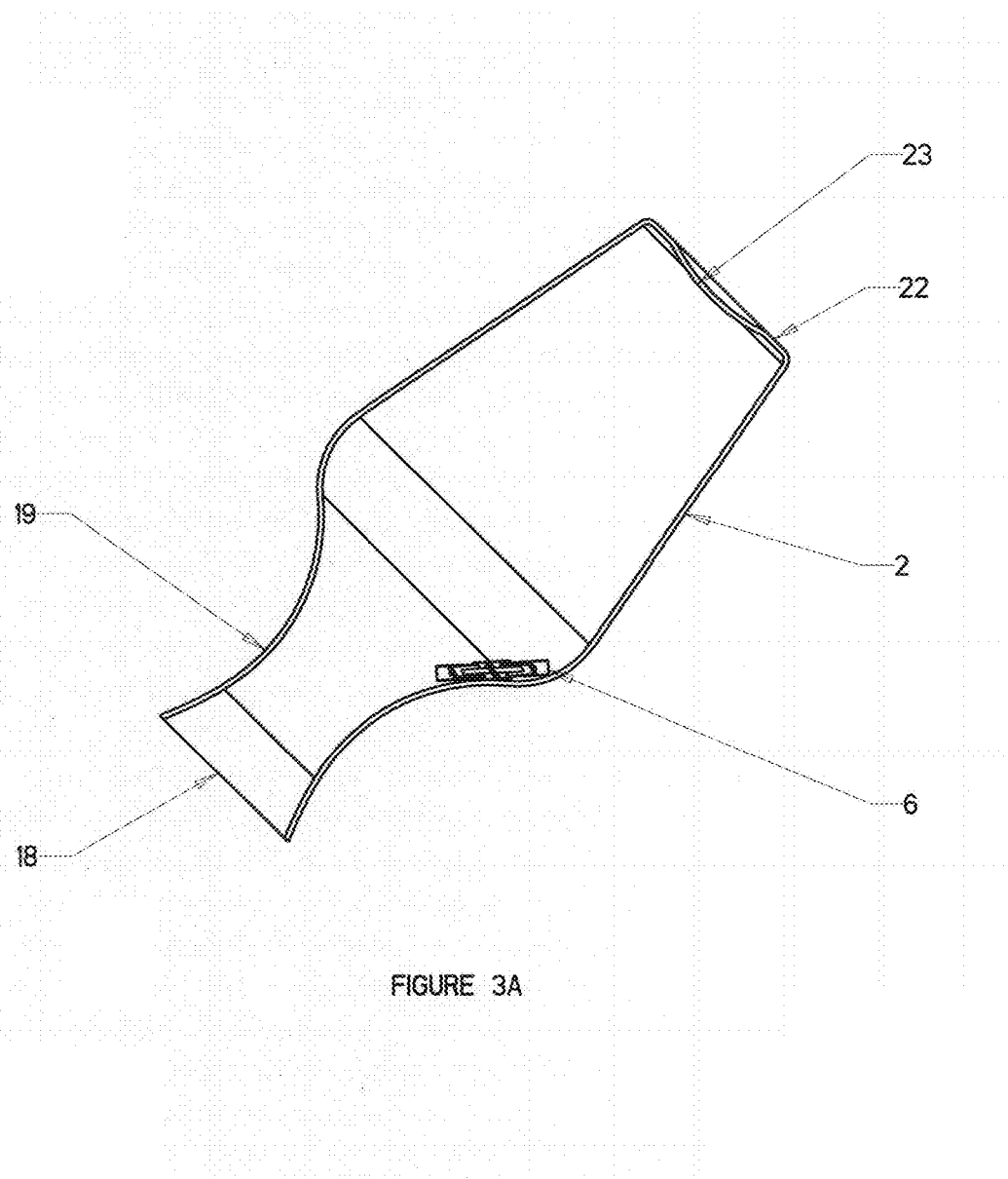
FIG. 3A is a front view of the stirring vessel from the embodiment of FIG. 1 in isolation, with the open spout rotated to the "pour" position and the impeller disengaged from the base of the vessel yet retained within the vessel body by means of the rounded hip and tapering neck portions.
Figure 3B:
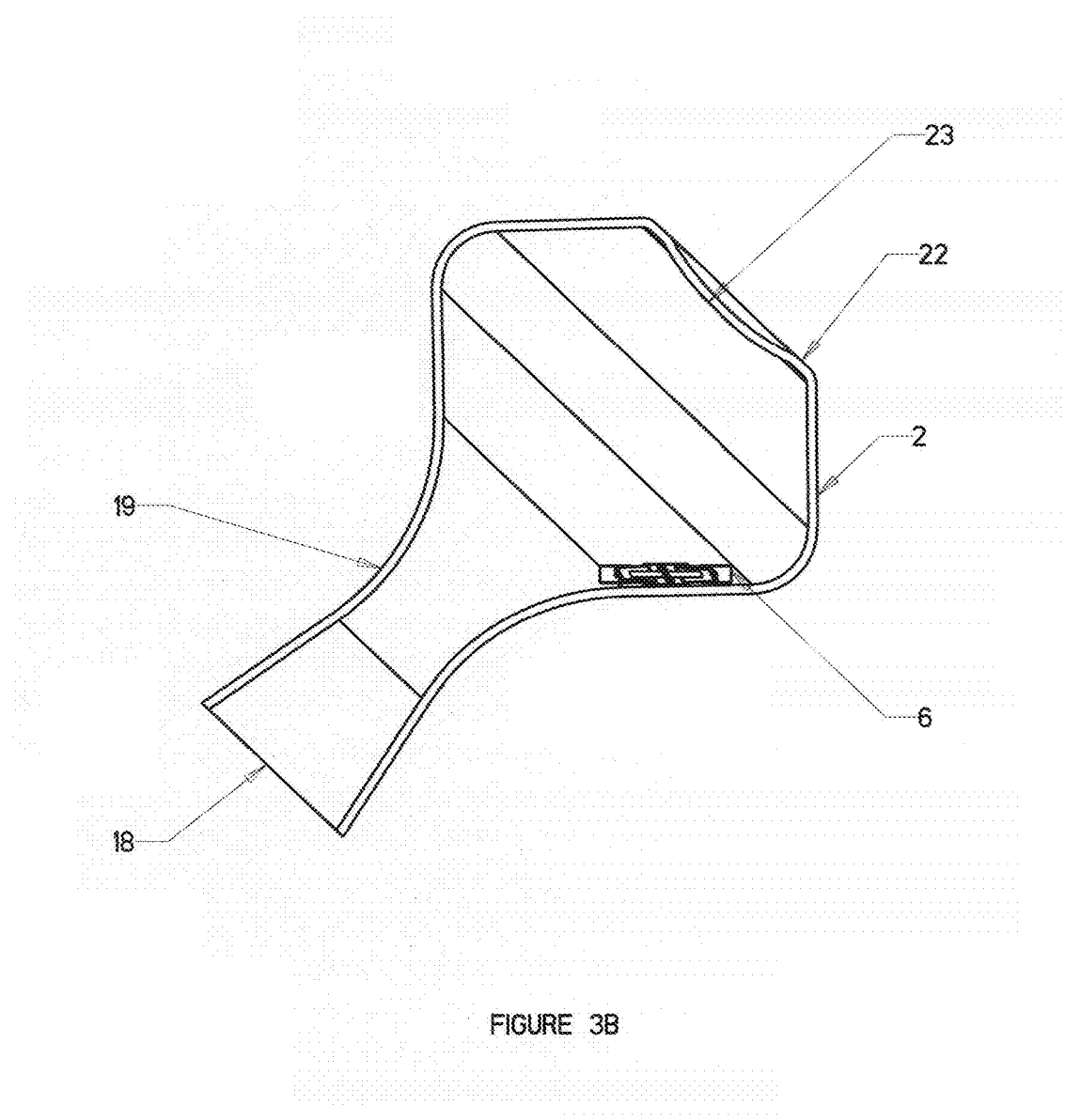
FIG. 3B is a front view of an alternate stirring vessel embodiment, again in isolation, with the open spout rotated to the "pour" position and the impeller disengaged from the base of the vessel yet retained within the vessel body by means of the rounded hip and tapering neck portions.

The shape of the impeller is designed in a way that during the pouring of the wine when the decanter is rotated upside down, the impeller will remain inside the vessel and not fall out. The effect is presented on FIGS. 3A and 3B.

Thus, within the practice of the present invention, the phrase "magnetic stirring impeller" refers to a device that is adapted to and retained within the base of the vessel, preferably just above the bottom surface of the vessel so as to reduce noise and friction, and rotated within the horizontal plane via magnetic coupling to the magnetic stir plate's coupling magnets. In certain embodiments, the underside of the captive magnetic stirring impeller may be provided with integral boss or button that establishes a small clearance between the base of the vessel and the bottom of the impeller. In an alternate embodiment, the base of the vessel may be provided with a centrally disposed convex surface that serves the same purpose as the boss or button, namely to establish a clearance between the spinning "blades" of the impeller and the base of the vessel. In such instances, the impeller may be adapted to fit within yet rest upon an internal concave bottom portion of the bottle. To that end, as noted above, glass bottles are normally concave or have an arched structure to be stable on a flat surface; the impeller of the present invention is designed to adapt to and coordinate with this integral structure. Both configurations essentially eliminate friction, and thus friction-associated wear out, and further allow for the formation of a more effective and efficient vortex.

The overall size and shape of a preferred impeller can vary with the intended vessel. As such, the present invention contemplates kits that include multiple impellers of varying diameters, as needed. In either case, preferred embodiments preferably have a profile that mirrors that of the vessel. Accordingly, as most conventional wine carafes and decanters have relatively curved or rounded periphery, the optimal impeller is likewise circular or ovoid, though other polygonal configurations are contemplated. In addition, so that they can be easily dropped into, employed, and removed from the vessel before and after use, it is preferable for the impeller to have a relatively flat, planar profile and further to have identical top and bottom profiles (i.e., symmetry about the horizontal axis) to facilitate rapid placement and employment regardless of top/bottom orientation. Finally, as vortex power and efficiency are directly proportional to the maximum dimension of the impeller, the "maximum diameter" of the impeller (i.e., a measurement designated as "d6" in FIGS. 5A, 5E and 6A) is smaller than the diameter of the vessel at the base.

For example, in a typical embodiment, the diameter of the impeller is on the order of approximately 44 mm whereas the diameter of the vessel is on the order of 55 to 78 mm. In other preferred embodiments, the magnetic stirring impeller may be optimized to have a maximum diameter of between 30 and 50 mm, preferably between 35 and 45 mm, more preferably on the order of 40 mm. In addition, the magnetic stirring impeller is optimized to be relatively thin and planar, having an overall thickness of less than 25 mm, more preferably less than 12-13 mm, more preferably less than 5-10 mm, more preferably on the order of 5-7 mm. See, e.g., FIGS. 5B, 5F, and 6B.

In terms of impeller design, the magnetic stirring impeller should be of a size and shape sufficient to give rise to a gentle vortex that allows for efficient and effective aeration. Thus, through empirical testing, the present inventors have determined that a design analogous to the so-called "Rushton turbine" type is preferred. The term "Rushton" is generically applied in the art to any flat-bladed or disk-turbine impellers.

The classic design of this impeller provides a simple radial flow pattern that moves material from the center of the vessel outward where it flows along the outer walls of the tank. It is most commonly used in any application requiring intense mixing. Their blades are flat and set vertically along an agitation shaft, which produces a unidirectional radial flow. Rushton and Rushton-type radial impellers are commonly used and most efficient in mixing any kind of powders that are not considered shear sensitive.

In prior applications, the present inventors have focused on radial/Rushton flow designs for the magnetic impeller; see, e.g., U.S. patent application Ser. No. 16/054,256 referenced above and incorporated by reference herein. However, we have discovered that a gentle stirring nature and a reduction of the shear force are highly desirable in the context of wine aeration. It is also important to evenly distribute oxygen throughout the liquid and from top to bottom of the liquid. Accordingly, we herein describe an alternate impeller designed to minimize radial/shear force.

As noted above, radial flow impellers (see FIG. 4A) are designed to move fluid sideways during rotation. The displaced fluid then either moves upwards or downwards or then back to the center towards the impellers only to be pushed outwards again to repeat the cycle. In contrast, axial flow is the movement of the fluid in an up and down, cyclic pattern; see FIG. 4B. The rotation of axial flow impellers makes the fluid move downwards and later upwards before being pushed down again to repeat the cycle.

Figure 4C:
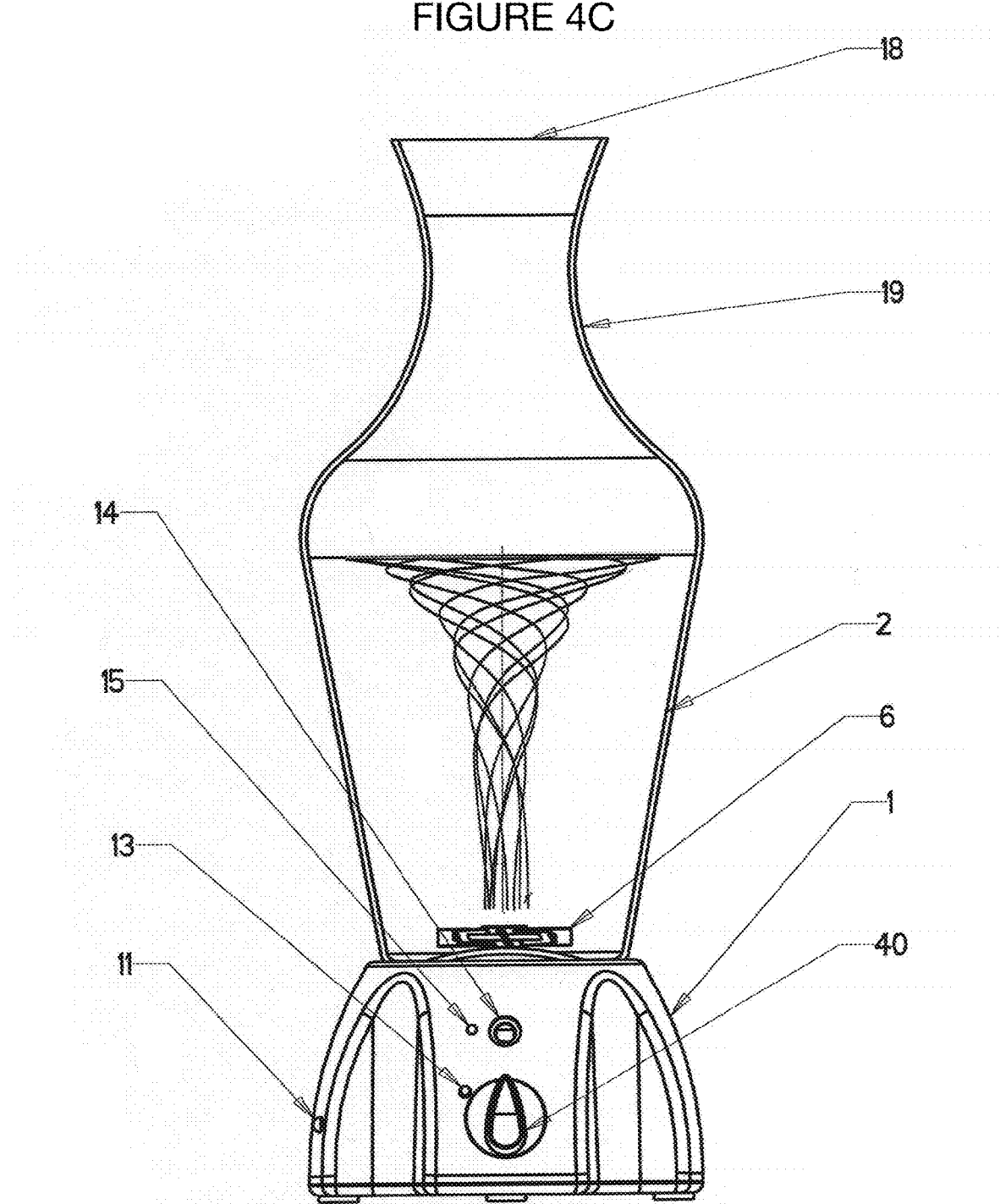
FIG. 4C depicts a fluid-filled embodiment of the illustrative magnetic stirring system depicted FIG. 1 in use, including a representation of the vortex formed.

As FIG. 4A shows, radial flow occurs when fluid is pushed away from the impeller's axis toward the vessel wall. Per FIG. 4B, axial flow occurs when fluid is pushed up or down along the axis or shaft of the impeller. The orientation of an impeller (whether left- or right-handed) and its agitating direction determine whether the direction of axial flow is up or down. A right-handed impeller option will push fluid in an upward direction toward the top of the vessel if agitation is clockwise (as viewed from the top). Conversely, left-handed option paired with a clockwise agitation will push fluid down toward the bottom of the vessel.

Through empirical testing, we have discovered that an impeller with pitched axial flow blades is most suitable for wine aeration. These are impellers with blades that are pitched at an angle, typically 30-45 degrees. These impellers produce a good balance between shear and fluid flow when rotated, making them suitable for a wide variety of applications.

In a preferred embodiment, the axial flow impeller is a left-hand impeller, with a blade tip that is angled upward to the left and the impeller rotating counterclockwise to direct liquid flow upward. See FIGS. 5D, 5E, 5F, 5G. This will create a more active and sufficient aeration by pushing liquid from top level to down, more intensive oxidation and mixing. A second important advantage of this design is the significant reduction of decoupling during the rotation of the impeller. The nature of the pitched axial flow motion is creating an axial vertical force component that will always push the impeller down to the bottom of the vessel helping the magnetic circuit keep the coupling.

Accordingly, an optimal magnetic stirring impeller optionally includes:
1. a central ring or annular component that acts to "seat" the impeller at the center of the base of the vessel;
2. a plurality of blades radiating from the center ring configured to generate the requisite gentle vortex for optimal aeration; and
3. at least one concentric outer ring that serves to both stabilize and rigidify the impeller, particularly the blades, and to protect against breakage, warping and torsional deflection.

Particularly preferred designs are depicted in FIGS. 5A-5H and 6A-6C.

In the context of the present invention, the central ring is preferably provided with an open diameter (designated as "d7" in FIG. 5B), on the order of about 8 to 12 mm, preferably about 9 to 11 mm, more preferably about 10 mm, that is designed to accommodate any abnormalities that may be present in the (optionally convex) center of the bases of the vessel (i.e., manufacturing bumps). The central ring may be further optionally provided with an open chamfer on one or both sides, angled to a bevel on the order of about 110 to 130 degrees, preferably about 115 to 125 degrees, more preferably about 120 degrees, that serves to center the impeller so as to sit properly on the concave bottom of the vessel. See, e.g., FIGS. 2A and 2B.

Figure 5A:
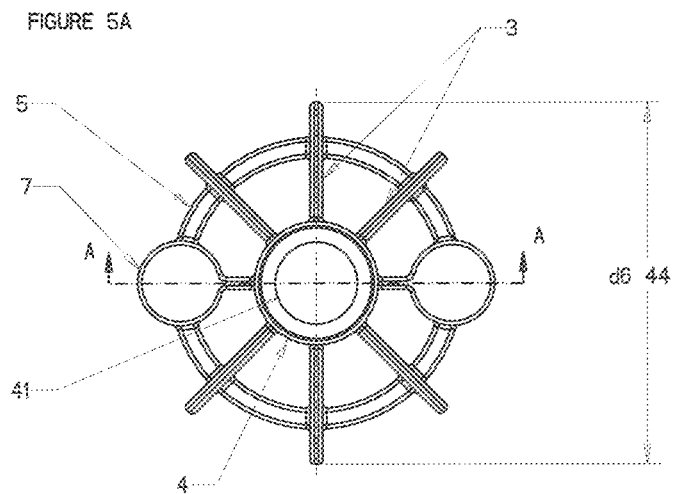
FIG. 5A is a top down section view of a first illustrative embodiment of magnetic stirring impeller of the present invention in isolation, namely a radial flow impeller characterized by a plurality of blades arrayed normal to the plane defined by the impeller body.
Figure 5B:
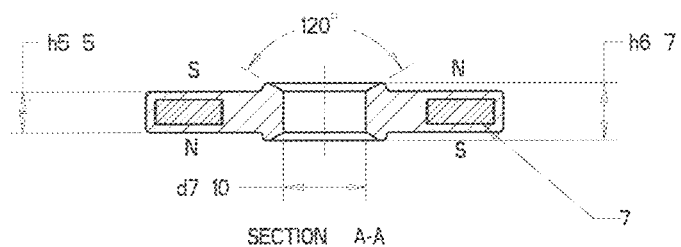
FIG. 5B is a cross-sectional side view of the illustrative magnetic stirring impeller depicted in FIG. 5A, along line A-A.
Figure 5C:
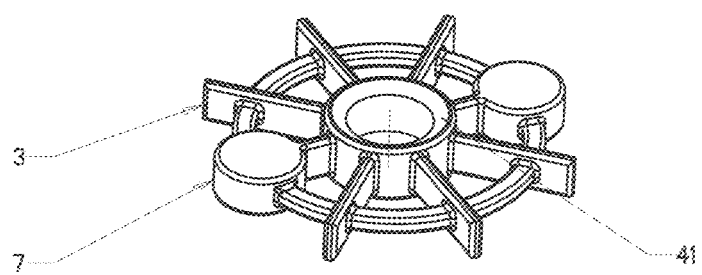
FIG. 5C is a perspective view of the illustrative magnetic stirring impeller depicted in FIG. 5A.
Figure 5D:
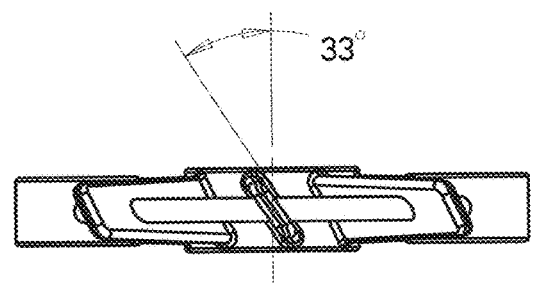
FIG. 5D is a side view of a second illustrative embodiment of a magnetic stirring impeller of the present invention in isolation, namely an axial flow impeller characterized by a plurality of pitched blades arrayed at an angle relative to the plane defined by the impeller body.
Figure 5E:
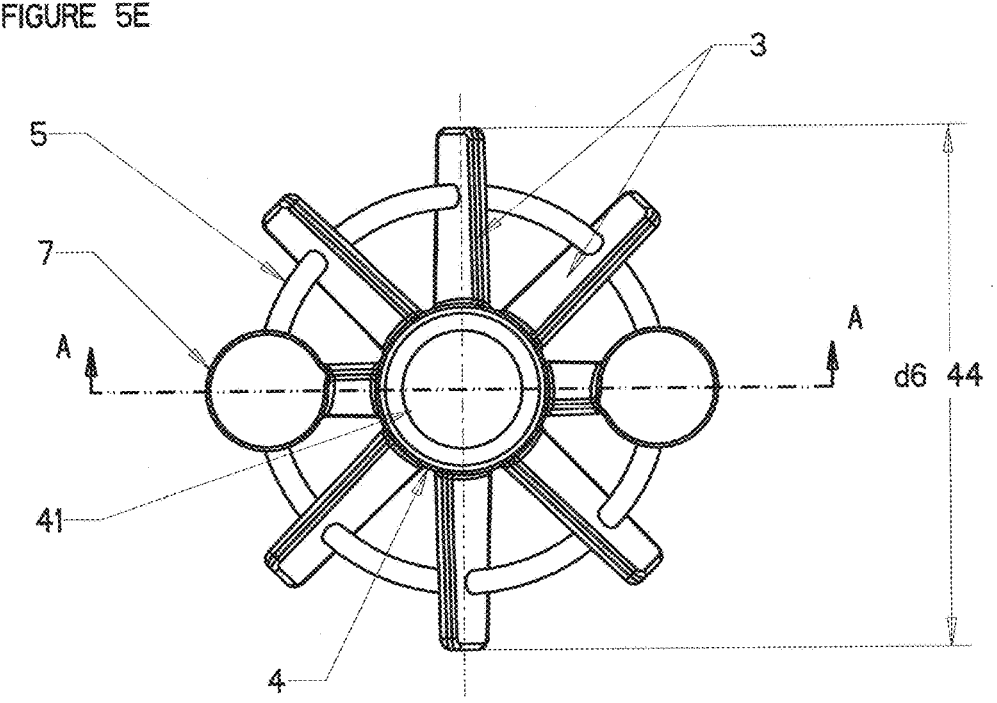
FIG. 5E is a top down view of the magnetic stirring impeller depicted in FIG. 5D.
Figure 5F:
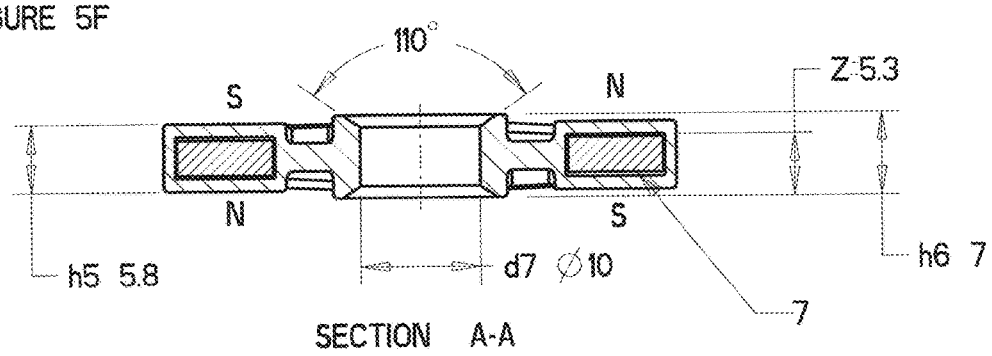
FIG. 5F is a cross-sectional side view of the magnetic stirring impeller depicted in FIG. 5E, along line A-A.
Figure 5G:
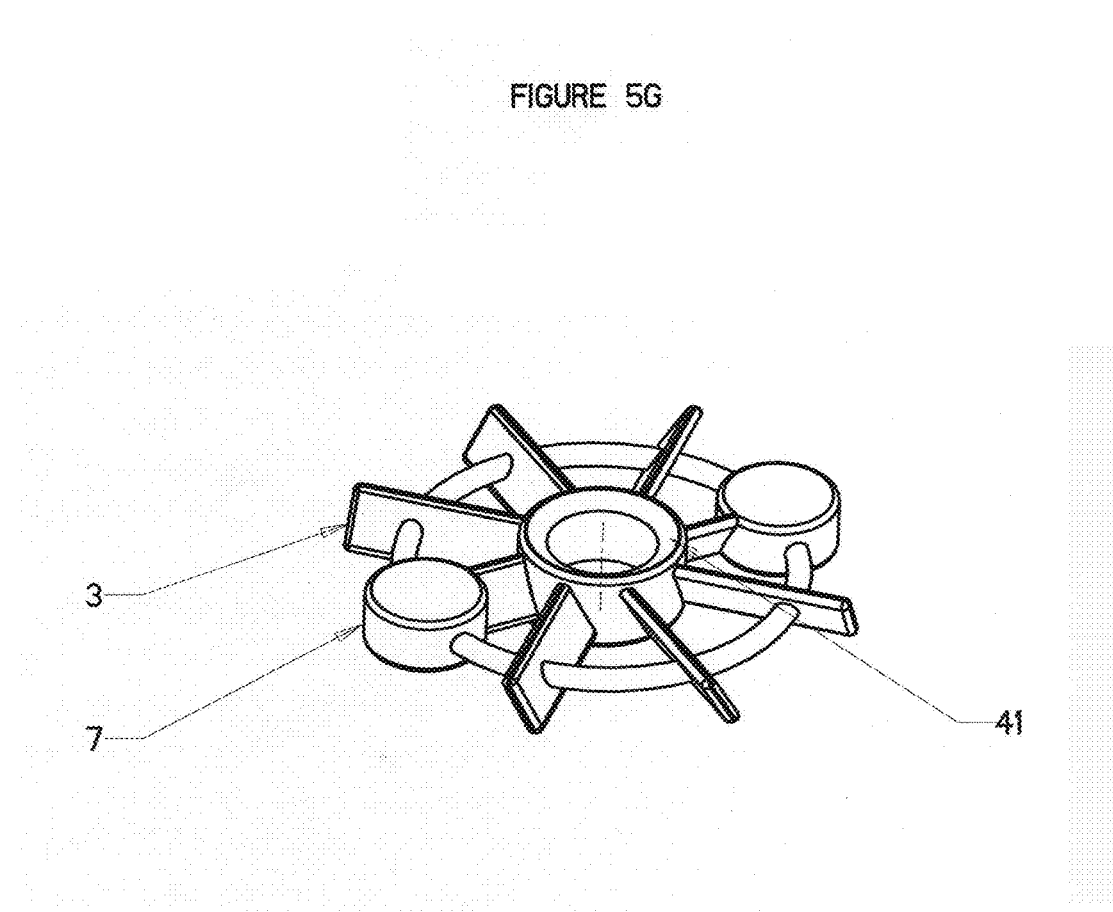
FIG. 5G is a perspective view of the illustrative magnetic stirring impeller depicted in FIG. 5E.
Figure 5H:
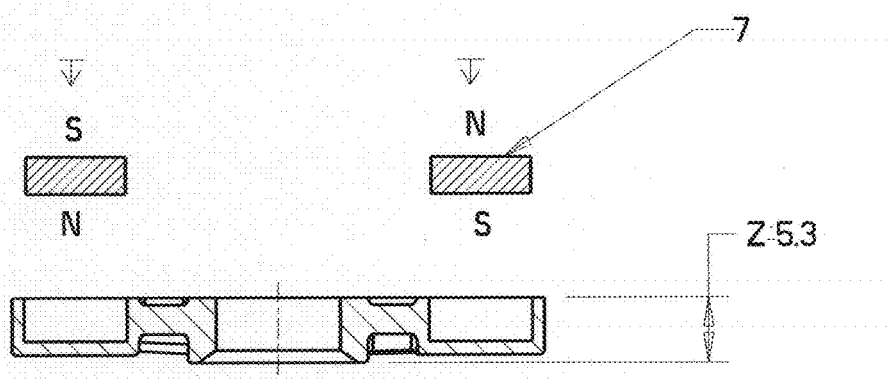
FIG. 5H is a cross-sectional side view of the magnetic stirring impeller depicted in FIG. 5E, along line A-A, depicting the step of magnet insertion.
Figure 6A:
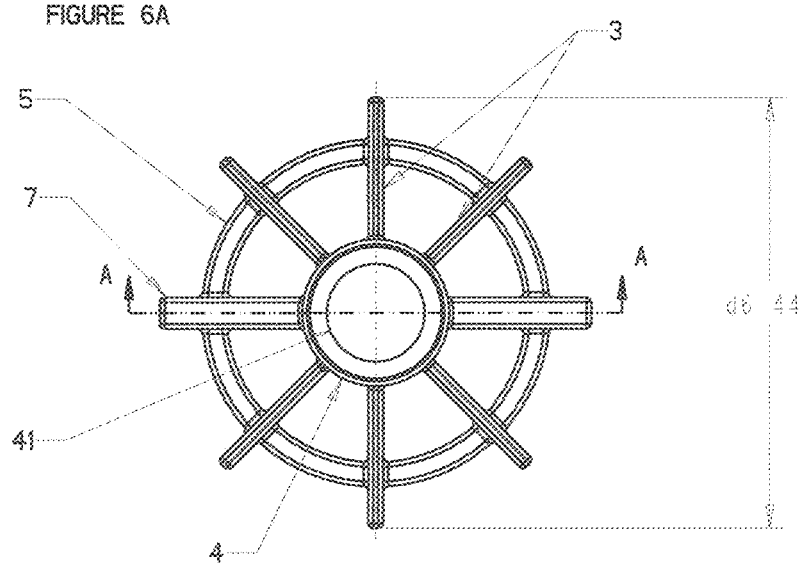
FIG. 6A is a top down view of a third illustrative embodiment of a magnetic stirring impeller of the present invention in isolation, a radial flow impeller analogous to that depicted in FIG. 5A in which the circular magnets of FIG. 5A are exchanged for a pair of rectangular bar magnets that double as blade elements.
Figure 6B:
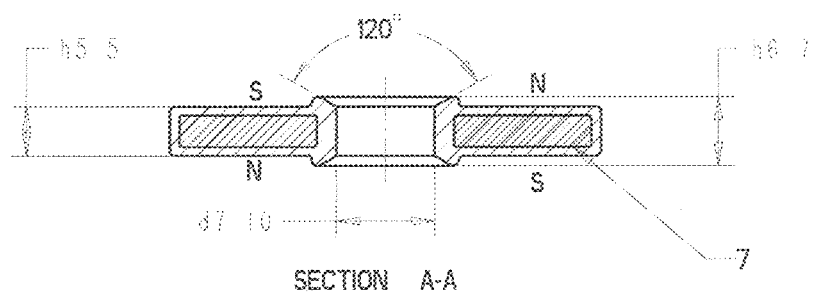
FIG. 6B is a cross-sectional side view of the magnetic stirring impeller depicted in FIG. 6A, along line A-A.
Figure 6C:
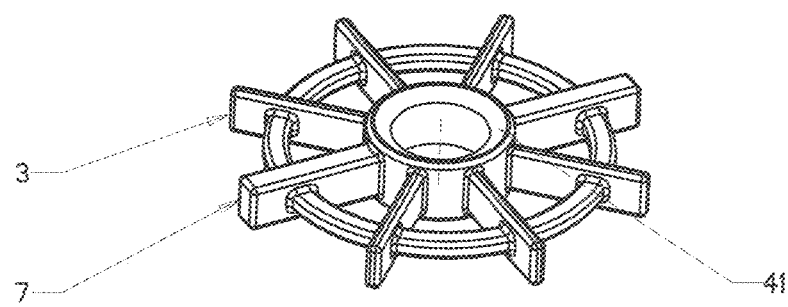
FIG. 6C is a perspective view of the magnetic stirring impeller depicted in FIG. 6A.

As depicted in FIGS. 5C, 5G, and 6C, the impeller preferably includes a number of "blades" radially splayed about the central ring, preferably in a symmetrical fashion, like spokes on a wheel. The overall shape of each blade is largely a matter of design choice and thus may vary from straight to curved, from rectangular to arcuate, symmetrical to asymmetrical. In a similar fashion, the number of blades is largely a matter of design choice, though symmetrical and thus even numbers are preferred, optionally ranging from 2-10, more preferably 4-8, more preferably 6. Likewise, while the blades depicted in FIGS. 5A-5C are shown as normal to the plane defined by the impeller (i.e., a vertical or upright arrangement), preferred embodiment of the present invention utilize a left-handed pitch away from the vertical axis, by 5 to 90 degrees, preferably 5 to 45 degrees, more preferably 10 to 35 degrees, more preferably 30 to 33 degrees.

In terms of dimensions, while the height and width of the blades is largely a matter of design choice, blade length is a critical factor in determining vortex efficiency. In a preferred embodiment, the ratio of blade span (i.e., a length measured from blade end to blade end, designated in FIG. 5A as approximately 44 mm) to the blade height is optimized to range from 8:1 to 4:1, more preferably around 6:1. For example, the blade height is preferably on the order of 10-20 mm, more preferably less than 12-13 mm, more preferably less than 5-10 mm, more preferably on the order of 5-7 mm (see, e.g., FIGS. 5B and 6B) while the blade span ranges from 30 to 100 mm, preferably 40 to 70 mm, more preferably on the order of 45 to 55 mm.

As noted above, the concentric outer ring serves to both stabilize and rigidify the blades of the impeller, ideally to protect against breakage, warping and torsional deflection. The blades may pass through or, alternatively, terminate at the outer ring. In addition, the invention contemplates the inclusion of more than one stabilizing ring.

In the context of the present invention, the magnetic stirring impeller is designed to carry or contain a magnetic, paramagnetic or ferromagnetic material to couple with the field of the coupling or drive magnets of the magnetic stir plate. In a preferred embodiment, ceramic or rare earth magnets are installed within the body of the magnetic mixing impeller. In a further preferred embodiment, two or more ceramic or rare earth magnets, for example fully magnetized Neodymimium (NdFeB) magnets, are encapsulated within the magnetic stirring impeller, for example, insert molded inside an injection molded impeller. However, recent advances offer the option of 3D-printing, which is described in greater detail below and depicted in FIGS. 7A-7C. In either case, for safety purposes, the magnets should be completely encapsulated with a minimum wall thickness of 1-2 mm all around.

In the context of the present invention, the paired magnets are preferably positioned on opposite sides of the central ring, evenly spaced and symmetrically aligned for balance purposes. While the precise size and shape of the magnets is largely a matter of design choice, rectangular bar magnets such as depicted in FIG. 6A are particularly preferred as they can then act as additional impeller blades. However, as noted in FIG. 5A, other shapes are contemplated.

The resultant magnetic fields of the magnet contained within the impeller optimally overlap with the magnetic fields of the magnetic stir plate's coupling magnets. In yet another embodiment, the two-impeller magnets within the captive magnetic stirring impeller have a vertical magnetic field vector sum. Thus, the impeller has two magnets wherein the summed magnetic field vectors of each magnet are vertical. Preferably, the summed magnetic field vectors of the two captive magnetic stirring impeller magnets are vertical and in opposing directions, namely up and down. This configuration optimizes the field overlap with the magnetic stir plates coupling magnets.

In the context of the present invention, the magnetic stirring impeller is preferably printed or molded from a plastic or polymer material, more preferably one that is FDA approved for food use, has a low coefficient of friction. Particularly preferred are acetal homopolymers, such as those sold under the tradename Delrin®, that offer an excellent balance of properties to bridge the gap between metals and plastics. In particular, Ensinger's Delrin® 150, a homopolymer acetal manufactured using DuPont Delrin 150 Resin, possesses high tensile and flexural properties, along with creep resistance and toughness, while exhibiting low moisture absorption, and fatigue endurance.

As noted above, it is an objective of the present invention to provide optimized aeration that overcomes the drawbacks of existing manual and automatic aerating systems and methods. Accordingly, a principal object of the present invention is to provide an improved acceleration and deceleration control system for the DC motor to avoid the disadvantages and difficulties of speed control of the prior art. Accordingly, within the practice of the present invention "acceleration and deceleration control system" refers to a specifically designed algorithm embedded into a microprocessor to automatically control the rate of speed of the DC motor housed in the stir plate component. While the selected algorithm may vary with the size of the vessel utilized, a preferred algorithm will provide gentle, slow agitation as well as a gradual reduction thereof. Likewise, the selected algorithm may vary according to the size, character and varietal of wine selected.

In a preferred embodiment, the control system utilized is a DC power of the electronic control systems. Thus, the magnetic stir plate is fitted with a DC power jack capable of receiving power from a low voltage DC power source. In a preferred embodiment, alternating current (AC) power is transformed to DC power from a wall-mounted transformer. In this embodiment, no AC power reaches the stir plate itself, thereby reducing the possibility and severity of electrical shock. However, in an alternate embodiment, the magnetic stir plate may be powered from an appropriate battery source.

Figure 8A:
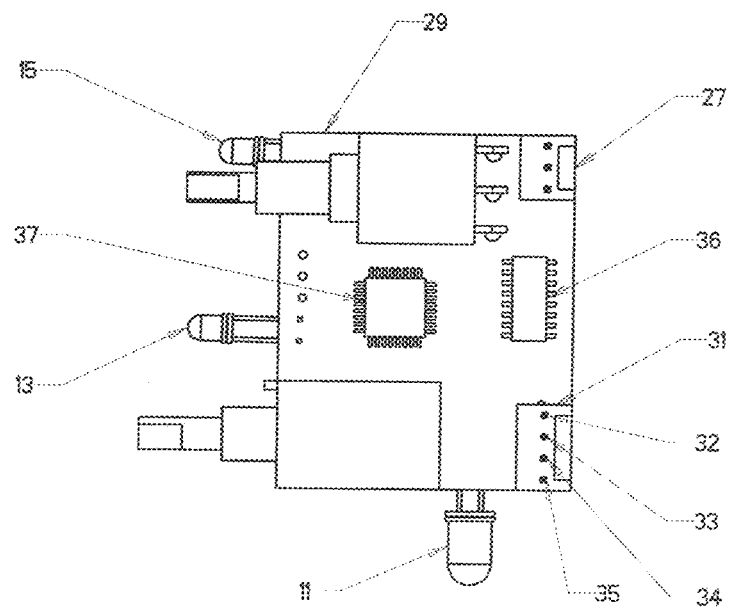
FIG. 8A is a schematic for an optional circuit board suitable for controlling the speed of the motor of the magnetic stirring system of the present invention.
Figure 8B:
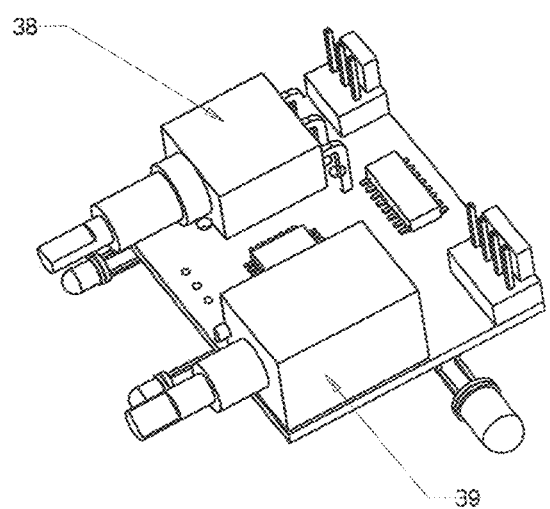
FIG. 8B depicts an alternate potentiometer and push button switch assembly that may be attached directly to the PC board.

In the preferred embodiment, a microcontroller is mounted to a PC circuit board that is integrated into the magnetic stir plate. More particularly, the PC board is preferably attached inside the stir plate and held in place by appropriate housing components. In an illustrative embodiment such as depicted FIG. 8A, the PC board 29 includes a first connector 31 having a first set of pins (32, 33) for power input, for example that communicate with a 9V wall charger (not shown), and second set of pins (34, 35) for power output, for example that communicate with and power the DC motor 12; a second connector 27 that connects with and charges the optional battery pack 16 as well as an optional temperature sensors (not shown); and a third connector 28 that connects with the actuator mechanism, such as push button 14 and/or potentiometer knob 40. See FIG. 1.

The microcontroller accepts data input from the linear speed control interface. The data is processed by the microcontroller and the appropriate action is taken according to the programmed commands. The preprogrammed microcontroller governs the action of the motor and as well as the display components. In an alternate embodiment, the microcontroller may be mounted on a PC board. One or more actuating mechanisms, such as a switch, lever, or push button, are preferably mounted to the front of the stir plate, along with appropriate display components, such as an LED indicator (see, e.g., the green and blue LED lights depicted on the front of the device). For example, a blue light LED indicator 15 is illuminated when the device is operated in automatic mode, via push button 14, which, in turn, activates a pre-determined aeration algorithm. Alternatively, the green LED indicator 13 is illuminated when the device is operated in manual mode, via manual rotation of potentiometer 40. The green LED indicator 13 and may start blinking after a selected cycle completes (e.g., in 10 min). The red light LED indicator 11 indicates when the battery falls below a minimum threshold and thus must be recharged before subsequent use (see FIG. 1). In the context of the present invention, the PC circuit board is designed for both push button ("Push") and potentiometer ("POT") functioning. There are two programming codes for both Push and POT operations. In a preferred embodiment, a first microcontroller, for example a single-chip microcontroller in Atmel's megaAVR family, such as the Atmega 328p TQFP chip depicted in FIG. 7 as element 36, constitutes the main microcontroller for the circuit while a second microcontroller, for example an NiMH battery pack charging controller as exemplified by the DS2715 chip, is used for power management and battery charging.

In a preferred embodiment, the control system of the present invention is designed to address three major aspects, namely:

1. Speed Adjustment

A PWM (Pulse Width Modulated) signal may be used to control the speed of the motor. This PWM signal may be generated by the microcontroller Atmega328 TQFP chip. The width of the pulse is directly proportional with the speed of the motor; so it can easily change the speed by varying the width of the pulse.

In a preferred embodiment of the present invention, the microcontroller chip has a Digital to Analog (DAC) converter section. In the context of the present invention, the DAC function is used to obtain the variable rotation speeds. This DAC output operates the power transistor that is in turn used to drive the motor.

2. Battery Charging Management System

A DS2715 IC, such as depicted in FIG. 7, element 37, may be used to manage the battery pack charging section of the circuit. The DS2715 is well suited for "smart" charge applications for NiMH cells. This chip is designed for reliable safe charging and it works as a switching charger. When the battery is fully charged, it is monitored by one of the contacts of the charger chip. In addition, a low battery level may be identified by measuring the voltage of the battery pack. This measurement is taken by a voltage divider part of the circuit. A user selectable charge timer allows charge rates from 0.167 C to 2 C. FAST-CHARGE, TOPOFF and DONE modes are included for the highly reliable, safe charging of NiMH cells.

3. Potentiometer or Push Button Controlling System

In the context of a potentiometer circuit, there is an inbuilt power switch. By way of example, if the dial is rotated, for example counterclockwise, the circuit will be powered off. If the dial is turned to the right, for example, in a clockwise direction, the circuit is activated, the motor turned on and the LED will indicate a green color indicating that the device is "in use". The speed of the motor can be changed according to the rotated angle of the POT. In the context of the present invention, after a pre-determined period of time has elapsed, for example a 6-12 minute, more preferably a 7-10 minute time period, the motor turns off automatically and the green LED may start to blink. Until the motor is started by rotating the POT, this LED will be blinking. If the battery is low when operating, the red LED indicator lights up until the charger is plugged in and battery is charged.

In the context of a push button circuit, there is no potentiometer to manually adjust the speed. Rather, the device is characterized by one or more pre-programmed speed profile(s), each of which may be optionally optimized for a particular wine type. For example, one may simply press the push button associated with a desired wine varietal, at which point the motor will rotate according to a pre-determined speed profile, examples of which are depicted in FIGS. 5A and 5B. As noted therein and elsewhere, the speed algorithm may be symmetrical or asymmetrical.

The push button controlling system automatically starts the program and the PWM output. The output signal is started with a low pulse and slowly and linearly increases the pulse width of the PWM signal until it reaches maximum speed. In one embodiment (such as depicted in F, this will happen within the first 2 minutes, more preferably within the first minute. The pulse width represents the duty cycle of the pulse. In an 8-bit variable, the decimal value can be changed between 0 and 255, so pulse width can be change by assigning 0 to 255 values on the PWM variable.

In the push button embodiment, the LED function is the same as in the POT. A prolonged press, for example more than 3 seconds, will turn off the circuit and power down the machine.

Although any methods and materials similar or equivalent to those described herein can be used in the practice or testing of embodiments of the present invention, the preferred methods, devices, and materials are now described in greater detail by reference to the exemplary embodiments. However, the following examples only illustrate aspects of the invention and in no way are intended to limit the scope of the present invention. As such, embodiments similar or equivalent to those described herein can be used in the practice or testing of the present invention. For example, it should be understood that, although steps of various processes or methods may be shown and described as being in a sequence or temporal arrangement, the steps of any such processes or methods are not limited to being carried out in any particular sequence or arrangements, absent an express indication otherwise. Indeed, the steps in such processes or methods generally may be carried out in various different sequences and arrangements while still falling within the scope of the present invention.

In addition, any reference to advantages, benefits, unexpected results, or operability of the present invention are not intended as an affirmation that the invention has been previously reduced to practice or that any testing has been performed. Likewise, unless expressly stated otherwise, use of verbs in the past tense is not intended to indicate or imply that the invention has been previously reduced to practice or that any testing has been performed.

EXAMPLES

Figure 2A:
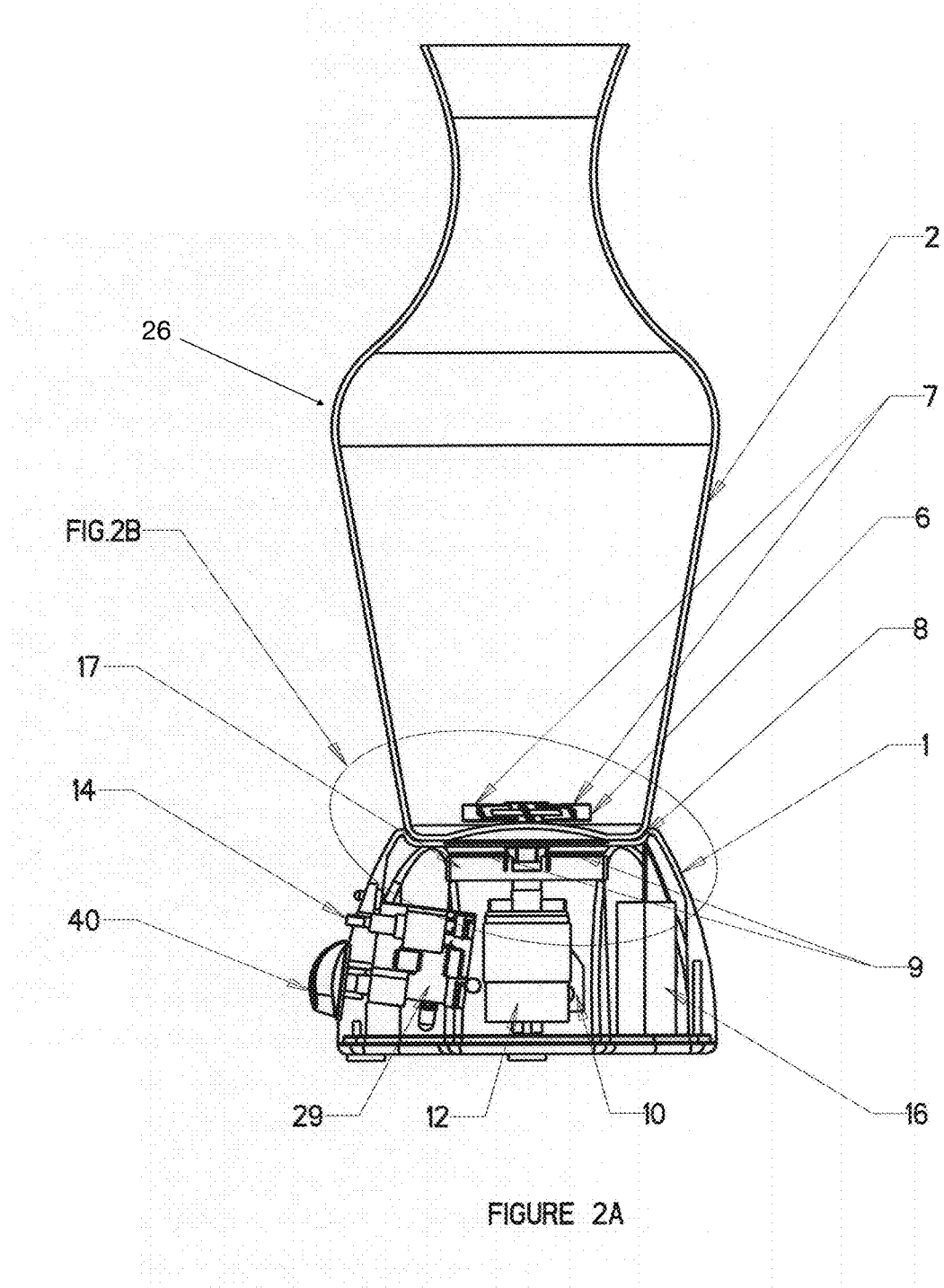
FIG. 2A is a cross-sectional view of the right side of the embodiment depicted in FIG. 1.
Figure 2B:
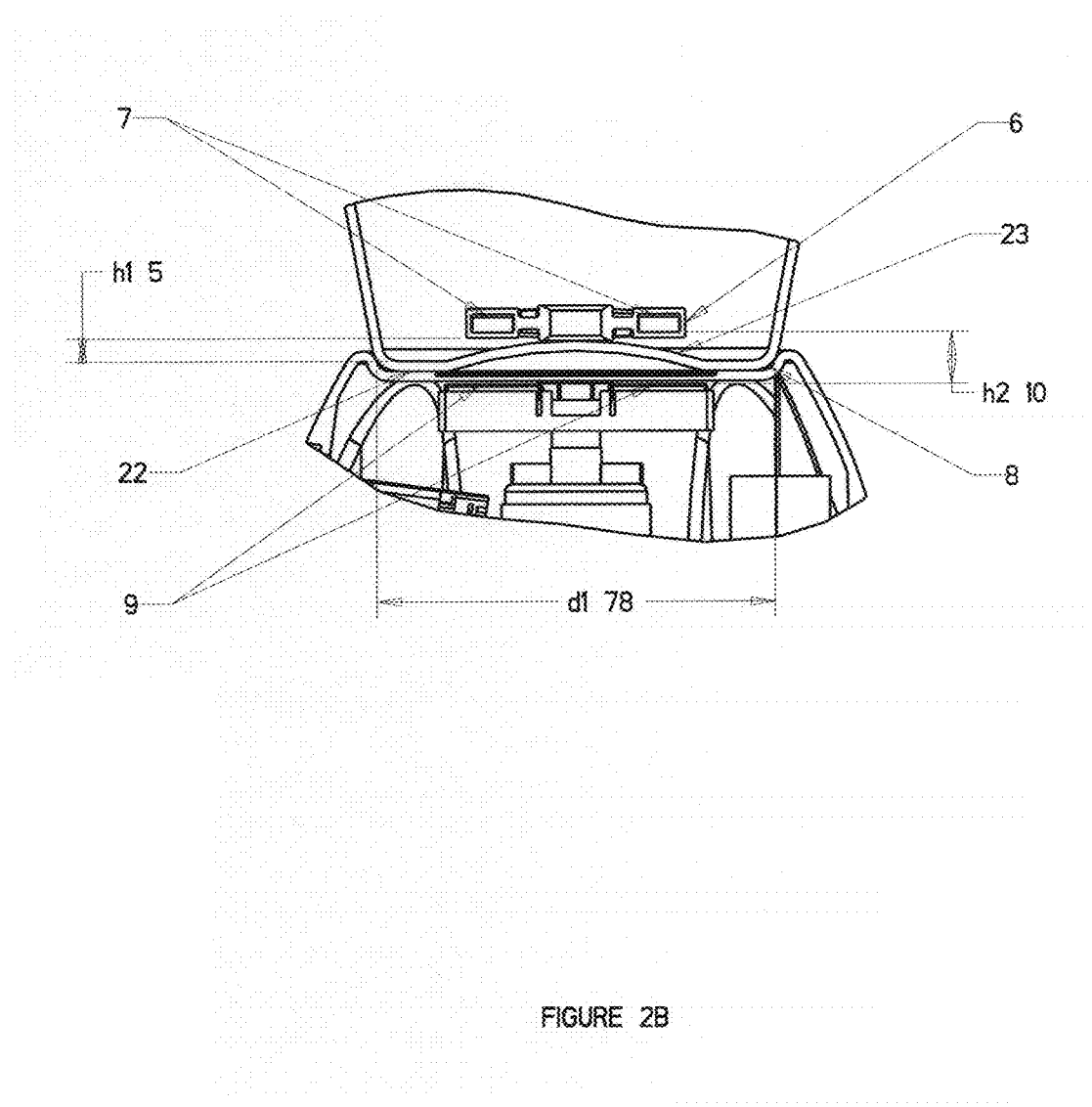
FIG. 2B is an expanded view of the circled section of the same label identified in FIG. 2A, depicting an enlarged (scale: 1.500×) cross-section view of the vessel coupled to the magnetic stirring base unit of FIG. 1 in which a magnetic stirring impeller of the present invention is adapted to the internal concave bottom of said vessel.

A preferred embodiment for the magnetic stirring system for aerating wine is shown in FIG. 1. The system, comprised of a magnetic stir plate 1, stirring vessel 2, and a magnetic stirring impeller 6, was designed and tested and the components of the system were fully integrated with each other to optimize wine aerating and utility for a home appliance. Referring to FIGS. 1, 2A, and 2B, stirring vessel 2 is characterized by an open top or spout 18, a tapered neck 19, an optionally widened hip 26 and a stable base 22. An expanded view of the base portion, and particularly magnetic stirring impeller 6 is set forth in FIG. 2B. As noted elsewhere, the magnetic stirring system of the present invention is adapted for use with virtually any conventional decanter or carafe. As such, additional and/or alternative features including, but not limited to, ergonomic hand and/or finger grips, grooved, ribbed, curved, and/or tapered sides and surfaces, and suitable volumetric markings, are likewise contemplated.

As discussed in greater detail above, the bottom of the vessel 2 is characterized by convex center section 23 (or alternatively a convex boss of button, not shown) designed to coordinate with the upper or lower surface of a center ring component 4 of the magnetic stirring impeller 6, more particularly the chamfered surfaces thereof; see, e.g., element 41 of FIGS. 5B, 5F, and 6B. In the embodiment depicted in FIG. 2B, the vessel 2 has a convex section 23 on which the impeller rotates above the bottom surface of the vessel, thereby reducing the friction and noise associated with traditional magnetic stir bars.

Referring to FIGS. 2A and 2B, the magnetic stir plate 1 has one or more recessed positioning elements 8 designed to align the vessel 2 on the stir plate 1, thereby greatly improving the stability of the vessel. In addition, the positioning element assures the magnetic field overlap of the mixer's coupling magnets and the magnetic stirring impeller is thus optimized. For example, the stir plate may include an outer ridge of a first diameter designed to coordinate with the diameter of a large vessel and a second concentric ridge and/or groove of smaller diameter, designed to coordinate with the diameter of a small vessel. The recessed positioning elements may be integrated into the top of the stir plate or alternatively be removable and/or provided separately, such as part of a kit. In either case, the coordinating vessel is designed to rest within the respective positioning element 8 of the stir plate, which, in turn, enables the vessel to be appropriately centered on the top surface of the stir plate.

The stir plate further houses a mounted PC board with a microcontroller 29. The speed control interface includes at least one software algorithm downloaded onto the microprocessor, a pushbutton control switch 14 for initiating a particular algorithm, an optional potentiometer dial 40 that allows for manual speed adjustment for larger capacity vessels, an optional blue LED light 15 or green LED light 13 that may blink or hold steady to indicate a cycle that is in progress and/or completed, an optional red LED light 11 that can indicate battery charge status and optionally blink when the battery is low. Two coupling magnets of opposite polarity 9 are aligned with two molded magnets of opposite polarity 7 into a stirring impeller to optimize magnetic schematic. The coupling magnets 9 are attached to the rotary iron bar 17 and are rotated in a horizontal plane by the DC motor 12. A DC power jack 10 can accept power from an AC wall mounted adapter (or other adapter such as a car adapter) or battery pack 16.

In the related embodiment, decoupling is greatly reduced through the acceleration ramp programmed into the microprocessor, which gradually winds-up the speed of the motor. When a stirring impeller rotates in the fluid, it generates a combination of flow and shear. The impeller generated flow can be calculated with the following equation:

$$Q = F1 * N * D$$

Impeller Diameter, "D" is the maximum diameter swept around the axis of rotation. Rotational Speed, "N" is usually measured in (RPM). This variable refers to the rotational speed of the impeller.

The power required to rotate an impeller can be calculated using the following equation:

$$P = Pop * N3 * D5 - \text{Turbulent regime}$$

In both equations rotational speed "N" is a decisive factor in the transition from a fluid statics phase (liquid at rest) to gradually increasing liquid velocity and steering energy, thus greatly reducing a potential for magnetic decoupling.

The specifications may be optimized for the size and shape of the magnetic stirring impeller. The particularly preferred embodiments depicted in FIGS. 5A-6C is suitable for use with blow-molded vessels characterized by a convex shape 23 at the center. In either case, the center ring 4 of the plastic injection-molded impeller 6 is designed to automatically align with the center line of the vessel, which, in turn, is aligned to the center of the magnetic stir plate (and thus the magnetic field established by the rotating iron bar(s) 17) by means of recessed positioning elements 8.

In the illustrative embodiments of FIGS. 5A-5H and 6A-6C, the magnetic stirring impeller is a relatively thin, relatively planar radial impeller having a thickness ranging from "h5" at the peripheral edge to "h6" at the annular center (i.e., 5 to 7 mm) and a diameter that is just slightly smaller than the vessel into which it is being placed, i.e., a diameter designed as "d6" (optimally 44 mm) vs. the diameter of the vessel designated in FIG. 2B as "dl" (i.e., optimally ranging from 55 to 87 mm). In the illustrative embodiments depicted, the radial impeller is adapted to an internal concave bottom of the vessel of height "h1" (optimally on the order of 5 mm) such that the distance between impeller magnets 7 and drive magnets 9 is likewise optimized (generally about 10 mm). The magnetic stirring impeller is furthermore preferably designed to have identical top and bottom surfaces so that it may be installed in either orientation.

With reference to the illustrative embodiments of FIGS. 5A-5H and 6A-6C, a magnetic stirring impeller of the present invention is preferably constructed like a ship's wheel, including:

1. a central ring or annular component 4 that acts to "seat" the impeller at the center of the base of the vessel;
2. a plurality of blades 3 radiating from the center ring configured to generate the requisite gentle agitation for optimal aeration with minimal shear force; and
3. at least one concentric outer ring 5 that serves to both stabilize and rigidify the impeller, particularly the blades, and to protect against breakage, warping and torsional deflection.

A preferred stirring impeller of the present invention employs an "open" design and "axial" flow within a mixing vessel. See FIG. 4B. The rotation of the axial flow impeller makes the fluid move downwards and later upwards before being pushed down again to repeat the cycle. In this manner, the impeller makes the entire liquid volume in the vessel swirl around as a homogenous body. The magnetic stirring impeller dimensions also affect the mixing capacity of the system. In turn, the optimal mixing speed is a function of the shape and size of the impeller.

For example, in a preferred embodiment, such as depicted in FIG. 5E, the impeller has a maximum diameter or dimension (measured across, from blade tip to blade tip) on the order of 44 mm diameter and a thickness of about 5 to 7 mm. The dimensions of the magnetic stirring impeller work best with a magnetic stir plate capable of providing mixing speeds from zero revolutions per minute (rpm) to a maximum speed of 2400 rpm, more preferably on the order of 100 to 650 rpm. The magnetic impeller 6 is made from plastic Delrin® 500P. Delrin® (Acetal Homopolymer) is ideal for injection molding parts that require low friction and excellent dimensional stability. Delrin®, an acetal homopolymer resin that is a highly-crystalline engineering thermoplastic that industry leaders specify for high load mechanical applications, is also FDA approved for use in the food industry.

In a preferred embodiment of the magnetic stirring impeller such as shown in FIGS. 5A-5H and 6A-6C, the impeller is comprised of two rare earth NdFeB magnets with a grade of N40SH. The Maximum Energy Product is (BH)max=38-40 MGOe and the Maximum Operating Temperature is 300° F. This very high BHmax makes the magnets suitable to avoid any demagnetization during the insert injection molding manufacturing process with a temperature around 350° F. The magnets 7 may take different shapes. For example, the magnets may be round, such as shown in FIG. 5A, or rectangular as shown in FIG. 6A. As discussed above, the latter configuration is preferred as it essentially allows each magnet to serve as an additional radial blade to thereby enhance vortex formation.

Figure 9A:
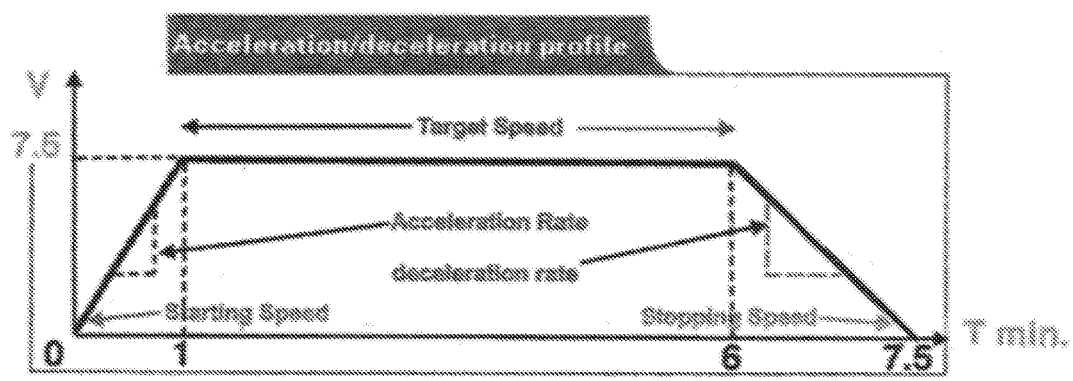
FIG. 9A is a diagram of an illustrative asymmetric acceleration/deceleration control profile that may be programmed into the microcontroller of the magnetic stirring system of the present invention.
Figure 9B:
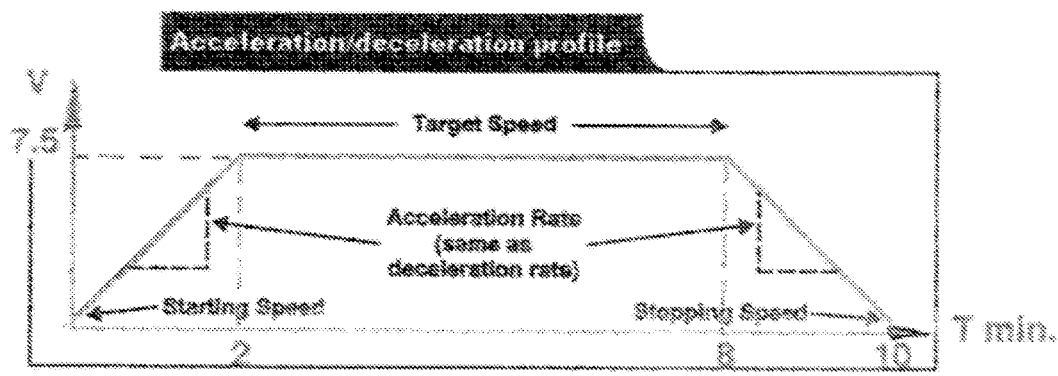
FIG. 9B is a diagram of an illustrative symmetric acceleration/deceleration control profile that may be programmed into the microcontroller of the magnetic stirring system of the present invention.
Figure 9C:
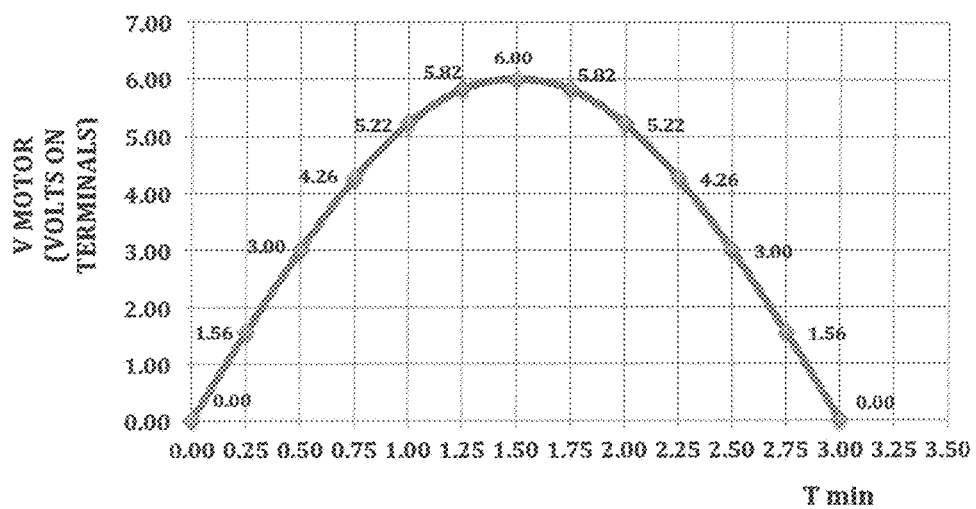
FIG. 9C is a diagram of an illustrative acceleration/deceleration control profile that may be programmed into the microcontroller of the magnetic stirring system of the present invention.

FIGS. 9A-9C illustrate illustrative acceleration/deceleration profiles represented in a Cartesian coordinate system where the abscissa represents the time (T) in minutes and the ordinate is the acceleration voltage DC that is in turn a speed of the motor in RPM.

In FIG. 9A, the profile is asymmetric, characterized by 1 minute of acceleration, 5 minutes at target speed, and 1.5 minutes of deceleration.

FIG. 9B presents the profile of an alternate algorithm, the implementation of which provides a pre-configured desired speed. In FIG. 5B, 20% of the total time is selected to accelerate the motor, 60% is selected to run the motor at a constant (reached) speed, and the remaining 20% is selected to decelerate the motor.

FIG. 9C depicts a sinusoidal path including a gentle acceleration period followed by an equally gentle deceleration period is particularly preferred.

The exemplary algorithms depicted in FIGS. 9A to 9C were chosen after setting up a proper blind taste test to avoid subconscious bias among the tasters. The "triangle test", which is a scientifically rigorous way to test, was used to define for a perceptible difference between wines prepared two different ways. Half a bottle of wine was prepared using "turbo" aerating and the other half of the bottle was saved for comparison.

By evaluating the voting records of select wine tasters, it was discovered that 90% of the time the integrated magnetic stirring system of the present invention provided consistent ratings of improvements to a particular wine using this algorithm. By accelerating and decelerating the motor properly, the system ensures that the application will operate efficiently and according to specifications. The particular algorithm selected, whether symmetric or asymmetric, is a critical part of designing an "ideal" application for the wine decanting control system.

The above examples of algorithm profiles are included to demonstrate preferred embodiments of the invention. It should be appreciated by those skilled in the art that the techniques disclosed in the example represent techniques discovered by the inventors to constitute preferred modes of practice. However, those skilled in the art should, in light of the present disclosure, appreciate that many changes can be made in the specific embodiments which are disclosed and still obtain a like or similar result without departing from the scope of the invention. For example, in the context of preferred embodiment, the algorithm may be generalized for use with a wide variety of wine or may alternatively be narrowly tailored to particular volumes and varietals. The accompanying actuating and display components may be readily adapted to reflect changes to and/or options afforded to the microcontroller by means of varying algorithms.

3-D Printing

A functional prototype of an impeller was 3D-printed to demonstrate the effectiveness of all-in-one 3D printing with magnets for rapid prototyping. The presented method allows for the integration of permanent magnets in a single print. Beyond the presented case, 3D printing of integrated magnets allows for an increase of design complexity at low costs early in product development, and contributes to speeding up the development process.

Conventional magnet manufacturing is a significant bottleneck in the development processes of products that use magnets, because every design adaption requires production steps with long lead times. In an effort to simplify integration of magnetic components, the present invention includes a method to directly insert magnets of arbitrary shape into thermoplastic parts by fused deposition modeling. This method was tested on an early prototype design of an impeller for magnetic drive coupling and has allowed production of subsequent prototypes of an impeller housing with integrated magnets in one piece on a low-cost, end-user 3D printer.

In iterative product development, conventional manufacturing methods with long lead times are a significant bottleneck for fast testing and validation. This holds true especially for the development of products that use magnets. Furthermore, conventional manufacturing techniques restrict the design of new and complex structures, not only for magnets but also in product development, because the assembly steps necessary to integrate the magnets into parts impose restrictions on design and prolong iteration cycles. The use of insertion methods for magnets during prototyping phases could, therefore, be of great benefit.

For the printing process, a low-cost, end-user FDM printer was chosen (Prusa i3 MK2, Prusa Research, Prague, Czech Republic). The slicer software, Slic3r Prusa edition 1.39.1 was used to generate the machine code for the 3D printer from the 3D model files (e.g., FIGS. 5E and 5H).

PETG is a filament which is used for 3D printing. The PETG filament was used for printing the housing impeller, as the building material in which the magnets were embedded. The most common PETG filament is an industrial strength filament with several great features. It combines the ease of use of PLA filament with the strength and durability of ABS filament. First, its strength is much higher than PLA and it is FDA approved for food containers and tools used for food consumption. Unlike ABS filament, it barely warps, and does not produce odors or fumes when printed. PET filament is not biodegradable, but it is 100% reclaimable.

PETG filament has good flexible strength, more than ABS filament. It exhibits an ideal combination of strength and flexibility, which is why it's used in so many mechanical parts or robotics. In addition, the filament is super-transparent with a glossy finish. It has great chemical resistance with good acidic and alkali resistance. The superb chemical resistance is why the FDA has approved PETG as acceptable for direct food contact. The filament is environmentally friendly and recyclable. PETG is also known for its transparency and clarity.

TABLE 1

Printer parameters for the impeller polymer-bonded compound filament PETG.

| Parameter | Value |
| --- | --- |
| Extruder Temperature | 230 Degrees Celsius |
| Layer Height | 0.15 mm |
| Printer Speed | 25 mm/second |
| Infill Density | 100% |
| Bed Temperature | 80 Degrees Celsius |

The aim to fabricate a prototype design of an impeller with inserted magnets and magnetic drive coupling was achieved. The impeller was successfully printed in one print cycle (FIG. 5G) with a print time of approximately 1 hour and tested after support material removal. The rotation of the impeller prototype at a maximum rotational speed of 1000 rpm was achieved. At higher rotational speeds, the magnetic coupling broke off but our optimal speed in an algorithm is only 600 rpm.

Figure 7A:
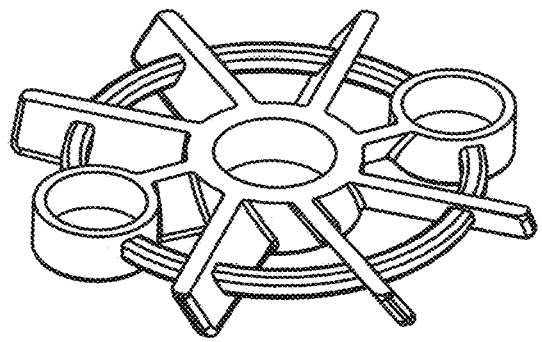
FIG. 7A to 7C depict the steps for assembling the magnetic stirring impeller of FIG. 5E using a 3D printer.
Figure 7B:
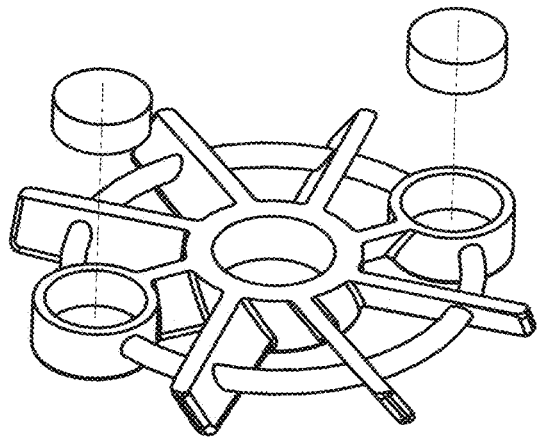
Figure 7C:
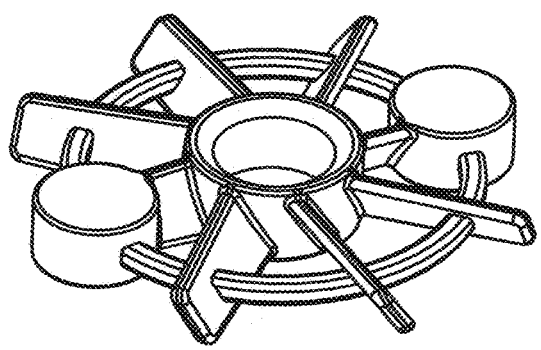

The installation of the magnets into impeller housing involves a quite simple process depicted in FIGS. 7A-7C. The Prusa i3MK2 control panel has a "pause" function. Using the dial on the control panel, one can navigate through the menus to "SD Card" then "Pause Print." It sometimes takes several seconds before the printer pauses because it must first execute all the commands already in the buffer before it can execute the pause instruction. The nozzle will move to the left and the bed will move forward placing the nozzle over the back left corner of the bed. Also the control panel has a function indicating the "Z axis" that shows the current Z height of the magnet at each moment of the printing process. The height Z=5.3 mm shows the exact moment when we should pause the printer (FIG. 7A), install magnets with opposite polarities (FIG. 7B) and then resume print with the same "Pause" function (FIG. 7C).

There are multiple ways to pause a print. Manually pausing the print has a few drawbacks, namely that one must be actively watching the printer to prepare for pausing. In addition, the manual pause does not allow fine control of the precise location of the pause. Controlling the pause through Gcode is a better method but quite complicated and will not presented in this application.

As a final matter, the present inventors considered the effect temperature might have on fully magnetized neodymium magnets (NdFeB) installed during the printing process of the impeller. They will begin to lose strength if they are heated above the maximum operating temperature, which is 176 F (80 C) for standard N grade. The Curie temperature (completely lost magnetization) is 310 C. Since PETG is a low temperature thermoplastic with a melting point of 87 C, the actual contact temperature with the magnet will not cause demagnetization.

INDUSTRIAL APPLICABILITY

As noted above, there is a need in the art for an improved magnetically-driven wine aerating system that addresses problems in the prior art, particularly the problem of magnetic decoupling and vortex deficiency. The present invention addresses this need providing a multipurpose stirring, storing and serving vessel having a removable magnetic stirring impeller disposed therein and coupled with a programmable magnetic stir plate adapted for use therewith. Although described in detail with respect to vessels and impellers of a particular size and shape, it will be readily apparent to the skilled artisan that the utility of the present invention extends to other embodiments.

The disclosure of each publication, patent or patent application mentioned in this specification is specifically incorporated by reference herein in its entirety. However, nothing herein is to be construed as an admission that the invention is not entitled to antedate such disclosure by virtue of prior invention.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Such other advantages and features will become apparent from the claims filed hereafter, with the scope of such claims to be determined by their reasonable equivalents, as would be understood by those skilled in the art. Thus, the invention is defined not by the above description, but by the following claims and their equivalents.

What is claimed:

1. An integrated magnetic stirring assembly for wine aeration comprising:
 a. a multi-purpose stirring, storage and serving vessel having an upper neck portion that includes an open spout in communication with a hollow interior, an intermediate body portion, and a lower base portion characterized by a relatively flat or planar stable bottom surface; and
 b. a removable magnetic stirring impeller retained within said hollow interior, at or near said bottom surface, characterized by:
  i. an annular support section, ii. a plurality of transversely-extending blades radiating out from said support section, and iii. two opposed, laterally spaced magnet components that together define a first vertical summed magnetic field vector, wherein said magnet components are symmetrically arranged about said annular support section and fabricated of magnetic, paramagnetic or ferromagnetic material;

wherein said stirring impeller is introduced into the hollow interior via said open spout and subsequently centered about the bottom surface of said vessel such that said plurality of transversely-extending blades can freely spin within said lower base portion section without contacting any surface of said vessel.

2. The integrated magnetic stirring assembly according to claim 1, wherein said vessel stirring impeller is injection molded from a plastic or polymeric material that is suitable for food use, and a low coefficient of friction.

3. The integrated magnetic stirring assembly according to claim 1, wherein said vessel is blow molded from a glass, polycarbonate, acrylic, and/or tempered glass material.

4. The integrated magnetic stirring assembly according to claim 1, wherein the bottom surface of said vessel is characterized by a convex center portion or dimple, further wherein the annular support section of said stirring impeller is aligned with and rests upon said dimple or convex portion.

5. The integrated magnetic stirring assembly according to claim 4, wherein said stirring impeller is symmetrical in design, further wherein the annular support section of said stirring impeller is characterized by top and bottom sides and a cylindrical periphery, further wherein one or both of said top and bottom sides of said annular support section are include a chamfered or beveled surface that serves to center the magnetic stirring impeller on said dimple or convex portion.

6. The integrated magnetic stirring assembly according to claim 1, wherein the magnetic stirring impeller comprises 4, 6 or 8 blades.

7. The integrated magnetic stirring assembly according to claim 1, wherein said plurality blade components are normal to the plane defined by said annular support section.

8. The integrated magnetic stirring assembly according to claim 1, wherein said blade components are pitched at an acute angle relative to the plane defined by said annular support section.

9. The integrated magnetic stirring assembly according to claim 1, wherein the ratio of the blade span to the blade height ranges from 8:1 to 4:1.

10. The integrated magnetic stirring assembly according to claim 1, wherein said magnetic stirring impeller further comprises an outer stabilizing ring concentrically disposed about said annular support section, wherein said plurality of transversely-extending radial blades intersect with said outer ring.

11. The integrated magnetic stirring assembly according to claim 1, wherein said magnetic stirring impeller has a relatively flat, planar profile and relatively circular periphery.

12. The integrated magnetic stirring assembly according to claim 1, wherein said magnetic stirring impeller has an overall thickness of about 5 to 25 mm and an overall diameter of about 30 to 50 mm.

13. The integrated magnetic stirring assembly according to claim 1, wherein each magnet component is insert molded within a respective blade so as to be completely encapsulated within said magnetic stirring impeller, with a minimum wall thickness of 1-2 mm all around.

14. The integrated magnetic stirring assembly according to claim 13, wherein each magnet component comprises a ceramic or rare earth magnet.

15. The integrated magnetic stirring assembly according to claim 13, wherein each magnet component comprises a fully magnetized Neodymimium (NdFeB) magnet.

16. The integrated magnetic stirring assembly according to claim 15, wherein each magnet component comprises a rectangular bar magnet housed within an analogously sixed and shaped rectangular blade.

17. The integrated magnetic stirring assembly according to claim 1, wherein said vessel comprises a carafe or flask characterized by a relatively conical, ovoid, or rounded body portion that tapers to a relatively long and cylindrical neck portion.

18. The integrated magnetic stirring assembly according to claim 1, wherein said open spout includes a flared lip adapted to mate with an optional closure mechanism selected from the group consisting of rubber, glass and acrylic stoppers useful for storage purposes.

19. The integrated magnetic stirring assembly according to claim 1, wherein the diameter of the vessel varies along the height, broadening from widened base to a maximized hip portion and then tapering to a narrowed neck portion, further wherein the ratio of height to maximum diameter ranges from 2:1 to 4:1, further wherein said hip and neck portions coordinate to prevent the impeller from being inadvertently dislodged from the vessel interior when the vessel is in an inverted "pour" position.

20. An automated wine aeration system comprising the integrated magnetic stirring assembly of claim 1 coupled with a magnetic stir plate, wherein said magnetic stir plate comprises:

a. a housing containing a DC motor driven by a DC power source via an associated power transistor, wherein said DC motor drives a horizontally disposed rotor bar and is activated by an actuator mechanism disposed on the exterior of said housing;

b. a PC circuit board integrated with said housing that includes a pre-programmed microcontroller for regulating the acceleration and deceleration of said DC motor in response to said actuator mechanism;

c. a pair of coupling magnets of opposite polarity attached to said rotor bar, wherein activation of said motor causes said coupling magnets to rotate in a horizontal plan and define a second vertical summed magnetic field vector; and d. one or more recessed positioning elements disposed about the periphery of the top surface of said housing that are sized to mate with the base of said stirring vessel and align the center of the stirring impeller with the center of the stir plate and thus align said coupling magnets and with said impeller magnets, such that said first vertical summed magnetic field vector overlaps with said second vertical summed magnetic field vector.

21. The automated wine aeration system according to claim 20, wherein the microcontroller includes one or more pre-programmed acceleration/deceleration speed profiles, each of which is optimized for a particular type of wine.

22. The automated wine aeration system according to claim 21, wherein the pre-programmed microcontroller generates a select pulse width modulated (PWM) signal that controls the speed of said motor in accordance with a selected speed profile.

23. The automated wine aeration system according to claim 22, wherein the speed profile dictated by said PWM signal is asymmetric.

24. The automated wine aeration system according to claim 23, wherein the acceleration/deceleration cycle is complete within 3 to 10 minutes.

25. The automated wine aeration system according to claim 21, wherein said pre-programmed microcontroller is associated with a visual display.

26. The automated wine aeration system according to claim 21, wherein said housing comprises two actuator mechanisms, namely a potentiometer and a push button control switch, each of which is associated with its own LED visual display.

27. The automated wine aeration system according to claim 26, wherein activation of said push button control switch automatically activates said microcontroller and said associated program and PWM output.

28. The automated wine aeration system according to claim 20, wherein said pre-programmed microcontroller includes a Digital to Analog (DAC) converter function that is used to obtain variable rotation speeds, wherein DAC output operates said power transistor that in turn drives said motor.

29. The automated wine aeration system according to claim 20, wherein said PC circuit board further comprises a smart charge microcontroller.

30. The automated wine aeration system according to claim 20, wherein said rotor bar comprises an iron and plastic assembly that is attached to a motor shaft that is driven by said motor.

31. The automated wine aeration system according to claim 20, wherein said DC power source comprises a low voltage DC power source transmitted through a DC power jack.

32. The automated wine aeration system according to claim 20, wherein said DC power source comprises an alternating current (AC) transformed to DC power from a wall-mounted transformer.

33. The automated wine aeration system according to claim 20, wherein said DC power source comprises a rechargeable battery that may be optionally integrated with said housing.

* * * * *